(12) United States Patent
Thomsen

(10) Patent No.: US 6,292,754 B1
(45) Date of Patent: Sep. 18, 2001

(54) VECTOR RECOMPOSITION OF SEISMIC 3-D CONVERTED-WAVE DATA

(75) Inventor: Leon Thomsen, Houston, TX (US)

(73) Assignee: BP Corporation North America Inc., Chicago, IL (US)

(*) Notice: Subject to any disclaimer, the term of this patent is extended or adjusted under 35 U.S.C. 154(b) by 0 days.

(21) Appl. No.: 09/438,765

(22) Filed: Nov. 11, 1999

(51) Int. Cl.$^7$ .................................................. G01V 1/28

(52) U.S. Cl. ........................................................ 702/14

(58) Field of Search .............................. 702/14, 17, 18; 324/303; 367/73, 45, 46, 75, 50, 51, 52, 53

(56) References Cited

U.S. PATENT DOCUMENTS

| | | | |
|---|---|---|---|
| 4,554,649 | * 11/1985 | Herkenhoff et al. | 367/68 |
| 4,755,972 | 7/1988 | Hanson et al. | 367/75 |
| 4,760,563 | * 7/1988 | Beylkin | 367/73 |
| 4,870,580 | * 9/1989 | Lang et al. | 367/68 |
| 5,343,441 | 8/1994 | Alford | 367/75 |
| 5,610,875 | 3/1997 | Gaiser | 367/75 |
| 5,677,893 | * 10/1997 | de Hoop et al. | 367/50 |
| 5,986,973 | * 11/1999 | Jericevic et al. | 367/24 |

OTHER PUBLICATIONS

Alford, R. M., 1986. "Shear Data in the Presence of Azimuthal Anisotropy", Society of Exploration Geophysicists Expanded Abstracts, 56, pp. 476–479.

Garotta, R. and Granger P. Y., 1988, "Acquisition and Processing of 3C X 3–D Data Using Converted Waves", Society of Exploration Geophysicists Expanded Abstracts, 58, pp. 995–997, Oct. 30, 1988.

Helbig, K., "Shear–Waves—What They Are And How They Can Be Used", Society of Exploration Geophysicists Shear–Wave Symposium, Midland 1984. Society of Exploration Geophysicists, vol. 1, 1986, pp. 19–36.

Lefeuvre, F. and Queen, J. H. "Progagator Matrix Processing Single Source 3–Component VSPs" Borehole Geophysics V:VSP II, 1992, pp. 163–168, Oct. 28, 1992.

(List continued on next page.)

*Primary Examiner*—Donald E. McElheny, Jr.
(74) *Attorney, Agent, or Firm*—James A. Gabala; Terry L. Watt

(57) ABSTRACT

The instant invention pertains generally to a method of seismic processing of multi-component converted wave 2-D and 3-D seismic data, wherein the seismic traces in each CCP gather may have been acquired at a variety of different source-receiver azimuths. According to one aspect of the instant invention there is provided a method of using recorded multi-component seismic data to determine an estimate of the orientation of the two principle coordinate axes of a subsurface medium, with this determination potentially being made in each seismic survey bin, and for each depth. Given this estimate, the seismic data may then be transformed via rotation into the coordinate system so defined, and thereafter processed using conventional algorithms (e.g., to produce velocity functions and images). Another embodiment of the instant invention uses a given principle coordinate axis orientation—which might have been obtained via the previous embodiment—to calculate a "best" data reduction of the traces in the CCP. In either case, the present invention additionally solves the problem of deducing the principal times series and provides a means of combining multi-azimuth multi-component CCP gathers for further conventional scalar processing. Those skilled in the art will appreciate that the methods disclosed below would be especially useful in 3-D surveys and in 2-D crooked line surveys.

25 Claims, 8 Drawing Sheets

OTHER PUBLICATIONS

Thomsen, L., "Weak Elastic Anisotropy" Geophysics, vol. 51, No. 10 (Oct. 1986), pp. 1954–1966.

Thomsen, L., "Reflection Seismology Over Azimuthally Anisotropic Media," Geophysics, vol. 53, No. 3 (Mar. 1988) pp. 304–313.

Willis, H. A., and Bielanski, E., "Azimuthal Anisotropy: Occurrence and Effect on Shear–Wave Data Quality", Society Exploration Geophysicists Expanded Abstracts, 56, pp. 479–481.

Yilmaz, Ozdogan, "Seismic Data Processing", Society of Exploration Geophysicists, 1987, pp. 9–89 and pp. 384–427.

Thomsen, Tsvankin and Mueller, "Layer–stripping of azimuthal anisotropy from reflection shear–wave data", in soc. Expl. Geoph. Expanded Abstracts, 289–292, 1995, the disclosure of which is incorporated herein by reference.

* cited by examiner

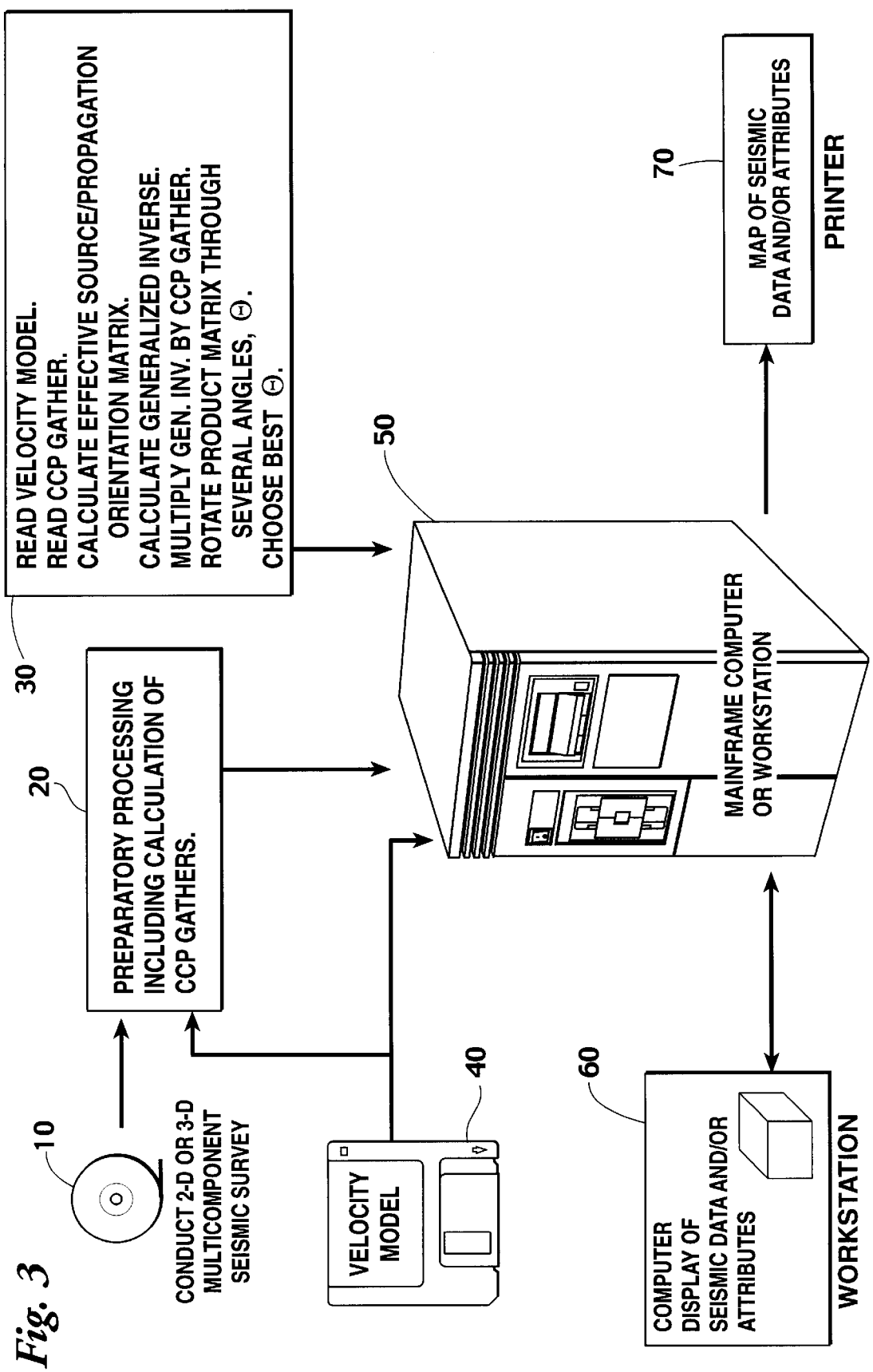

VECTOR RECOMPOSITION OF SEISMIC 3-D CONVERTED-WAVE DATA

TECHNICAL FIELD

The present invention concerns 2D and 3D converted-wave seismic surveys. It also pertains to 2D and 3D wide-azimuth seismic surveys.

BACKGROUND

A seismic survey represents an attempt to map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is moved to various positions across the surface of the earth above a geological structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single straight line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both methods interrogate some volume of the earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. The term "unstacked" seismic traces is used by those skilled in the art to describe seismic traces as they are collected in field recordings. This term also is applied to seismic traces during the processing sequence up to the point where traces are "stacked" or averaged together after first being corrected for timing differences. General background information pertaining 3D data acquisition and processing may be found in Chapter 6, pages 384–427, of SEISMIC DATA PROCESSING by Ozdogan Yilmaz, Society of Exploration Geophysicists, 1987, the disclosure of which is incorporated herein by reference. Chapter 1, pages 9 to 89, of Yilmaz contains general information relating to conventional 2D processing and that disclosure is also incorporated herein by reference.

A modern seismic trace is a digital recording (analog recordings were used in the past) of the energy reflecting back from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Thus, each digital sample in a seismic trace is associated with a travel time (in the case of reflected energy, a two-way travel time from the surface to the reflector and back to the surface again). Further, the surface location of each trace in a seismic survey is carefully recorded and remains associated with that trace during subsequent processing. This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be extracted from a stacked or unstacked seismic volume by collecting all of the digital samples that occur at the same travel time. This operation results in a 2D plane of seismic data. Similarly, a vertical plane of seismic data may be taken at an arbitrary azimuth through the volume by collecting and displaying the seismic traces that lie along a particular line. This operation, in effect, extracts an individual 2D seismic section from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation subsequently applied to seismic data collected over other exploration targets.

Speaking in broad generalities, seismic energy propagates through the earth in one of two forms: compressional or "P" waves and shear or "S" waves, either of which might be generated by a wide variety of seismic sources. "Converted waves" travel first as one type of wave and then the other, the conversion between wave-types happening at any seismic discontinuity. If the conversion, from an incident P-wave to a reflected S-wave, happens at the reflector, this reflection mode will be called a C-wave.

Anisotropic media are those in which the P and S velocities depend upon the direction of wave propagation and of polarization. In anisotropic media, each conversion will in general reflect both fast and slow shear waves, which modes may be termed fast and slow C-modes. Flat-lying polar anisotropic ("VTI") layers give rise to only one C-mode (polarized in-line) reflection. For general information pertaining to anisotropy in the context of geophysical exploration, see Thomsen, "Weak elastic anisotropy", Geophysics, v. 51, no. 10, 1986, pp. 1954–1966, the disclosure of which is incorporated herein by reference.

Shear waves have vector displacements in the plane at approximately right angles to the raypath or direction of propagation and travel with a velocity dependent on the shear rigidity of the medium. Thus, shear waves contain different information about the subsurface structure along the raypath than do P-waves. Shear waves do not propagate through fluids, as fluids lack the stiffness necessary to support their passage. General background information on shear waves can be found, for example, in Helbig's article "Shear-Waves—What They Are and How They Can Be Used," in SHEAR-WAVE EXPLORATION, 1986, Danbom and Domenico, eds., pp. 19–36, the disclosure of which is incorporated herein by reference.

A shear wave propagating through an anisotropic medium generally splits into two phases with the fixed polarizations and fixed velocities that propagate in that particular direction. The medium establishes two orthogonal directions of polarization (for each direction of shear wave propagation), with each polarization potentially having a different shear wave velocity (i.e., "fast" and "slow" polarizations). These special directions may be related to the "principle coordinate axes" of the medium. Of course, in general the orientation of the principle coordinate axes is unknown (before the collection and processing of the seismic data), and must be determined from the data. Note that the orientation of the source does not have any effect upon the polarization axes, except that the source orientation determines how much energy is partitioned into each of the two polarization modes. General background information on shear-wave splitting in the exploration context may be found in Thomsen "Reflection seismology over azimuthally anisotropic media", *Geophysics*, v. 53, no. 3, 1988, pp. 304–131, the disclosure of which is incorporated herein by reference.

Since shear waves travel slower than P waves through the same medium, a "normal move out" correction ("NMO" correction, hereinafter) at P velocities leaves a good deal of residual moveout in shear events, which causes them to be attenuated in a conventional common midpoint ("CMP") stack. However, here are many exploration and exploitation settings wherein one would wish to preserve—rather than to suppress—converted-wave arrivals. For example, consider a hydrocarbon reservoir, above which the overburden contains a small concentration of gas. This gas will severely attenuate conventional P-waves traveling through this overburden, so that the underlying reservoir will be poorly imaged on a "P" section. However, since the gas-filled rock unit does not attenuate shear waves, one would expect to be able to obtain better images of such reservoirs using conventional pure-mode S-wave techniques. If the prospect lies under water, then the same logic predicts that converted-wave techniques may be successful.

Conventional seismic processing relies heavily on a stack (or time-corrected average) of seismic traces from a CMP gather to reduce coherent and incoherent noise in the seismic section, and as a tool for estimating subsurface velocities (through a velocity-dependent travel-time correction that is applied prior to the averaging). The stacking approach is generally satisfactory for single mode seismic data, but requires modification when applied to converted mode data. One reason for this is that the travel path of a converted mode wave is asymmetrical, even for simple horizontally layered media. Multiple coverage of the same subsurface point cannot be achieved for C-mode data by stacking a CMP gather, but instead requires the formation of a true common reflection point ("CRP", hereinafter) sorting which, for C-mode reflections, is actually a common conversion point gather (a "CCP" gather, hereinafter). In brief, the standard methods used to form converted mode CCP gathers in the past have been generally unsatisfactory.

One method for properly constructing a CCP gather is given in Thomsen, U.S. Provisional Patent Application No. 60/082,251, filed Apr. 17, 1998, the disclosure of which is incorporated herein by reference. By way of brief summary, in that reference the inventor teaches that the preferred method of constructing such a gather is founded on an initial determination (or assumption) that the converted-wave arrivals of interest are converted from P to S at a subsurface reflector, rather than at some other point on the raypath. In that case, the offset (from the source) of each conversion/reflection point may be separately calculated for each source-receiver pair, and for each arrival time, using the methods given therein. Finally, a flattened CCP gather is computed for each of a dense set of discrete positions $(x_c, y_c)$ on the same surface, which surface represents, at every reflection time, converted-wave energy arriving from some source-receiver pair (as calculated above), and the surface bin represented by that CCP point is converted. This is done separately for each component of the recorded signal, using the same velocity for each.

Multi-component seismic surveys use a combination of receiver types to record the returning seismic energy. Typically there will be three directional receivers at each recording location: a vertical geophone and two horizontal geophones. Each of these receivers are designed to translate motion on the surface of the earth into an electrical signal representative of the amplitude and frequency of the motion. The vertical component is usually some variant of a conventional seismic receiver that is sensitive to vertical ground motion. There may also be a hydrophone at each recording location, but that variation will not be discussed here. There are usually two horizontal receivers at each recording site, each of which is sensitive to horizontal ground motion along a single axis of movement. By convention, the two horizontal receivers are usually deployed at right angles to each other so that horizontal ground motion along any axis can be effectively detected. Of course, ground motion that exhibits horizontal displacement in a direction that is not in exact alignment with the axis of movement of either of the horizontal detectors will have energy appearing on both of the horizontal detectors. Standard 2D methods are available to those skilled in the art (e.g., "rotation") for reconstructing the magnitude and direction of horizontal ground motion from the two shear signals e.g., see Thomsen, 1988, "Method of seismic exploration including processing and displaying shear wave seismic data", U.S. Pat. No. 4,755, 972, Alford, 1994, "Multisource Multireceiver Method and System for Geophysical Exploration", U.S. Pat. No. 5,343, 441, the disclosures of which are incorporated herein by reference). See also Thomsen, 1988, "Reflection seismology over azimuthally anisotropic media", cited previously.

By convention, it is usually assumed that the response of the receiver components is equal for equal ground displacements in the various axial directions, i.e., that the recording has "vector fidelity." If the instrument does not at least approximately meet this assumption, the recording should be corrected before the vector operations—such as those described hereinafter—are applied.

In current state-of-the-art converted wave processing schemes, the assumption is usually made that the earth through which the seismic signal passes is azimuthally isotropic (i.e., either completely isotropic, or perhaps polar isotropic with a vertical symmetry axis) and the reflectors are flat lying. In such a case (see, for example, Aki, K. and P. G. Richards, 1981, QUANTITATIVE SEISMOLOGY, Freeman Press, N.Y.), the upcoming shear wave will be polarized in the vertical plane containing the source and the receiver. Hence, during processing each 2-component (x, y) shear record is mathematically rotated about a vertical axis so that one of the new coordinates axes (say, x') is aligned to be parallel to the source-receiver direction. If the instrument records the ground motion with true vector fidelity, this rotation operation results in a seismic trace (x') that contains the signal that would have been recorded if one horizontal component of the receiver had been parallel to the source-receiver direction when the source was excited. After rotation, these "radial" x' traces can be processed—for the most part—as through they were part of a standard CRP gather. The other seismic trace that emerges from the rotation—i.e., the y' or transverse trace—is typically ignored, since by conventional wisdom it should be "null" and contain only noise, since all of the coherent seismic energy is supposed to have been moved to the x' trace by the rotation process.

However, in practice one typically finds that the component (y')transverse to the source-receiver direction (x'), is typically not null, but instead contains data, often comparable in strength to that on the x' component itself. This may happen for a number of reasons, but in flat-lying geometry the most plausible cause is azimuthal anisotropy of the medium. It is well known (see, for example, Thomsen, 1988, cited previously) that, in such cases, the polarization is determined by the medium, rather than by the source (as in the isotropic case discussed previously).

When multi-component shear wave data from such media are recorded, each component will normally contain contributions from both fast and slow shear modes. It is usually necessary and/or desirable to separate these two modes, since without such separation, they interfere with each other, making interpretation difficult. Additionally, traces containing the combined modes cannot easily be processed and stacked, as each trace contains some combination of slow and fast events which may occur at the time travel time. However, knowledge of the angular orientation of the principal axes of the subsurface medium is a prerequisite to doing this separation. Thus, one of the greatest challenges facing interpreters and explorationists is that of deducing the orientations of the principal axes of a 3D converted wave survey, so the principal times series can be determined. 3-D seismic surveys—and some 2-D crooked line surveys—present an additional challenge to the processing geophysicist. As is well known to those skilled in the art, each CCP "bin" in such a survey consists of a small area (usually a few meters on each side) beneath which are the reflection points of a number of unstacked traces, each potentially collected at a different source-receiver azimuth. Thus, there is no single survey azimuth angle that can be used to rotate all of the traces in a bin into alignment with the principal axes: each trace must be separately rotated to a common heading. Note that, each source-receiver azimuth may be thought of as a separate interrogation of the unknown orientation of the subsurface anisotropy, and each recorded trace contains potentially unique information about the unknown subsurface fracture orientation. Alford 1994, cited previously, teaches the most common method of deducing this information from 3D or 2D land surveys, in which the sources are polarized horizontally and excite shear waves directly in each of two orthogonal orientations. However, there has been, in the past, no systematic way of using this multiplicity of information to estimate the subsurface principal axes for converted wave surveys.

A variety of ad hoc approaches to solving the aforementioned 3-D converted wave problem have been suggested. For example, Garotta and Granger ("Acquisition and processing of 3C×3D data using converted waves", *Soc. Expl. Geoph. Expanded Absts*, 58, 995–997 (1988)), the disclosure of which is incorporated herein by reference), divide the CCP gathers (taken from bins of a 3D survey) into restricted-azimuth subsets, and compare the energy found on the radial component with that on the transverse component. The mid-angle from each restricted range-of-azimuths becomes a candidate for the rotation angle $\Theta_0$, with the mid-angle for which the transverse energy was minimal within a computation time-window ultimately being selected as $\Theta_0$, where $\Theta_0$ represents the angular difference between the survey coordinate system and the underlying anisotropy orientation. However, this method suffers from an implicit assumption that the distribution of offsets (and, hence, the conversion efficiency) within each restricted-azimuth subset is the same or comparable, and it additionally suffers from a certain arbitrariness in the choice of the range of the azimuthal restrictions.

More recently, Gaiser ("3D converted shear wave rotation with layer stripping", U.S. Pat. 5,610,875, the disclosure of which is incorporated herein by reference) revisited Alford's original approach, using 3D data collected into bins, but without stacking. However, this method requires that the gather be composed of CCP-pairs arising from matched sets of sources and receivers which are mutually orthogonal and of equal offset (hence equal conversion efficiency). This restriction is not normally met in practice.

So, as was recognized by the present inventor, there continues to be a need for a method of determining the axes of orientation of a subsurface medium from seismic data consisting of source-receiver pairs collected at a variety of different azimuths. Further—and this is especially true in the case of a multicomponent 3D seismic survey—this determination should be made for each CCP bin and at each depth. The method should be statistically based and should employ the entire data-set in each bin, so as to overcome the shortcomings of the prior art discussed previously. Finally, the method should yield good estimates of the axes of orientation for use in subsequent seismic processing.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The instant inventor has discovered an improved method of processing multi-component converted wave 2-D and 3-D seismic data, wherein the seismic traces in each CCP gather may have been acquired at a variety of different source-receiver azimuths. Those skilled in the art will appreciate that the methods disclosed below would be most useful in wide azimuth 3-D surveys and in 2-D crooked line surveys, including those situations wherein the source comprises a single azimuth of shear excitation. Note that the terms "CCP" and "CCP gather" will be used hereinafter in the broadest possible sense of those terms, and that usage includes seismic traces that are even very rough approximations to "true" CCP traces. Further, those terms can even be taken to include conventional seismic CMP traces in some circumstances.

There are two main embodiments of the instant invention: a first embodiment provides a method of calculating a "best" data reduction of the traces in a multi-azimuth multi-component seismic data CCP gather. The resulting seismic traces can be conventionally rotated and processed thereafter. A second embodiment uses recorded multi-component seismic data to determine the orientation of the two principle coordinate axes of a subsurface medium in each seismic survey bin, and for each depth. The second embodiment may employ the first embodiment as a pre-processing step. Given a known (or estimated value) of this subsurface orientation, the seismic survey data may be transformed via rotation into the coordinate system so defined, and thereafter processed using conventional algorithms (e.g., to produce velocity functions and images). In either case, the present invention additionally solves the problem of deducing the principal times series and provides a means of combining multi-azimuth multi-component CCP gathers for further conventional scalar processing.

Turning now to a first aspect of the instant invention, there is provided a method of processing converted mode multi-component multi-azimuth seismic data which features a model-based statistical means of CCP data reduction. The instant method begins with the formation of a flattened CCP gather at each of the many surface bins of the survey using, for example, the methods of Thomsen 1998 cited previously.

Then, using the known source-receiver azimuths of the traces in the CCP gather, an effective source orientation matrix is calculated. Also, a propagation matrix is formed, which contains model-based estimates of the amplitude of an idealized P-wave at each time point ($\Delta t$) and for each source-receiver azimuth. Generally speaking, the entries in this matrix will be obtained from a velocity model by ray-tracing, or by some similar technology. As is well known to those skilled in the art, these matrices may be multiplied together to form a composite "source/propagation" matrix.

As a next step, a generalized matrix inverse is computed for the source/propagation matrix at each designated time level. The computation of the generalized inverse (or pseudo-inverse as it is also known) results in a matrix that, when right-multiplied by the source/propagation matrix, yields a matrix that is "nearly" an identity matrix. If the dimensions of the source/propagation orientation matrix are 2 by 2 at each time slice, then the generalized inverse would be expected to yield the actual matrix inverse of those four values. More generally—and of more interest for purposes of the instant invention—if each time slice of the source/propagation matrix is of dimension 2 by n (where n is the number of traces in the gather), the generalized inverse would be expected to be n by 2, and the resulting 2 by 2 product matrix would be optimally close to the identity matrix.

The matrix (more particularly, a "tensor") of generalized inverses is then matrix multiplied—at each time level—by the 2 by n tensor containing the multi-component traces from the CCP gather. The resulting tensor product (2 by 2) matrix now contains four traces—two multicomponent "pairs" of traces—that are broadly representative of the multi component CCP gather from which they were calculated. In some sense these traces are a best composite 2 by 2 representation of the original CCP gather in the coordinate system of the survey. The particular length of these trace pairs obviously depends on the number of time levels processed.

Turning now to a second embodiment, according to another aspect of the instant invention, there is provided a method of determining an orientation of the subsurface principle axes from a 2 by 2 CCP gather calculated as described above from multi-component seismic traces collected at a variety of source-receiver azimuths. Broadly speaking, the instant method preferably operates by the methods of Alford, 1994, cited previously, or extensions thereof. In the simplest of these methods, a provisional rotation angle is chosen, the angle being provisional in the sense that it is an estimate of the unknown angle through which the receivers in the seismic survey would need to be rotated in order to align them with the principle axes. Using the provisional angle of choice, one or more CCP gathers are then processed and preferably stored on disk (or stored within computer memory for subsequent display). This procedure is repeated using several different provisional rotation angles, thereby building an ensemble of processed seismic traces from which the proper angle of rotation may be determined by inspection or through further calculation.

One popular method of determining the proper angle of rotation using this ensemble of processed traces involves a comparison of the on-diagonal and off-diagonal traces in the rotated CCP gathers. It is well known that if the correct angle of rotation has been used, the off-diagonal traces of the tensor product matrix of the previous embodiment will tend to be small because the coherent reflections have been concentrated within the on-diagonal traces. By making this comparison at a variety of angles, a "best" rotation may be selected, where "best" means, for example, the rotation angle which results in a rotated CCP gather that has the most energy concentrated along the principal diagonal. The fast-slow time delay may then be estimated by cross-correlation of the two diagonal traces. See, Alford, 1994, cited previously.

It should be clear that this determination of a proper rotation angle may be done automatically via a variety of computing algorithms, and that such a procedure can provide important advantages when large numbers of seismic traces are to be processed. Further, if a sufficient number of gathers are processed by the previous methods, seismic sections and/or volumes may be formed from the individual traces so processed. Each of the sections or volumes so formed will potentially contain only fast (or slow) shear modes. Alternatively, model-based methods, which solve simultaneously for both angle and time-delay by estimation of parameters in a simple model may be used.

While this invention is susceptible of embodiment in many different forms, there is shown in the drawings, and will hereinafter be described in detail, one or more specific embodiments of the instant invention. It should be understood, however, that the present disclosure is to be considered an exemplification of the principles of the invention and is not intended to limit the invention to any specific embodiments or algorithms so described.

BRIEF DESCRIPTION OF THE DRAWINGS

FIG. 3 illustrates the general environment in which the invention disclosed herein would typically be used.

DETAILED DESCRIPTION

Description of the Problem

Figure 1:
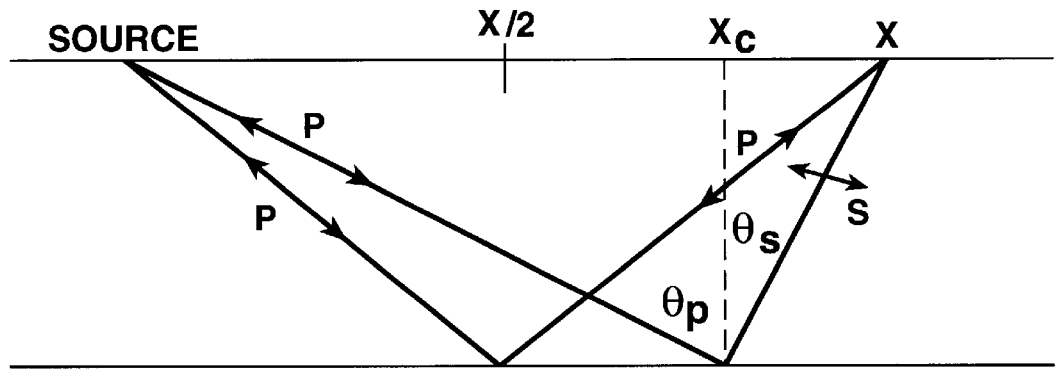
FIG. 1 contains a representation of converted wave geometry for a single thick, homogeneous, isotropic layer.

In a typical 3D seismic survey, seismic sources are excited (e.g., fired) from many surface positions, and recorded at many surface positions. The data are then processed to enhance arrivals in which each raypath (i.e., travel path for seismic energy) reflects beneath a single primary reflection point (FIG. 1). The recorded seismic waves are then interpreted in terms of the position, and the elastic parameters of that common reflection point. For a P-wave survey in flat-lying geometry, the reflection point lies at the midpoint between source and receiver. In a converted-wave survey conducted over that same geometry, however, the reflection point is moved away from the mid-point and in the direction of the receiver.

Figure 2A:
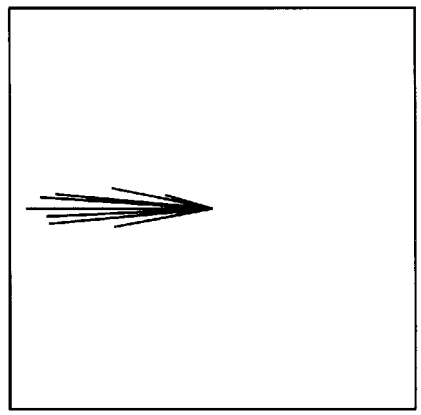
FIG. 2A illustrates a typical marine source-receiver azimuth distribution for a 3D bin and FIG. 2B illustrates a typical land or ocean bottom source-receiver azimuth distribution.
Figure 2B:
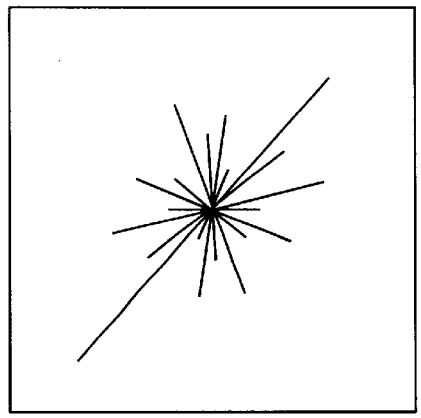
Figure 6:
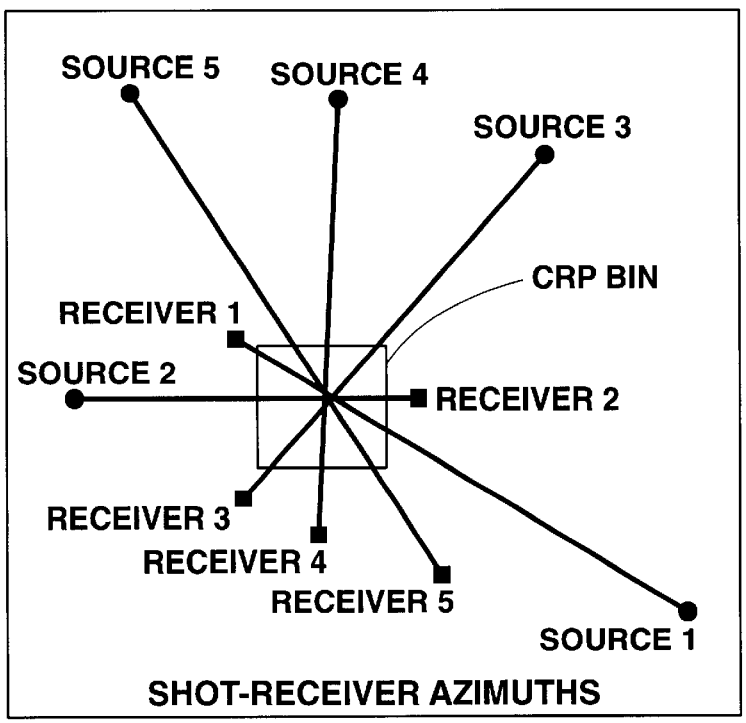
FIG. 6 illustrates in a general way how shot-receiver azimuths arise in practice.

As is well known to those skilled in the art, it is customary that seismic data containing reflections from the same subsurface reflection point, can be collected together to form a Common Reflection Point (CRP) gather. In many 2D surveys, this is normally relatively straightforward, but in 3D surveys, this operation is more complicated, since it is not generally practical to position the sources and receivers so that the travel paths of the recorded seismic energy all reflect exactly beneath the same surface point. Instead, it is customary to collect all of those seismic traces which contain energy reflected from points beneath a small area (for example, within a 10m by 10m "bin") into an approximate CRP gather. FIG. 6 contains a schematic illustration of one such CRP gather, wherein each line radiating from the center of the CRP bin indicates a particular source-receiver azimuth and where the length of each line segment is proportional to the source-receiver offset. In a typical towed-streamer 3D survey, each bin will contain rays with a wide distribution of offsets, but a narrow distribution of source-receiver azimuths; FIG. 2A illustrates one such bin. On the other hand, in a typical land 3D survey, or a typical ocean bottom seismic (OBS) survey, each bin (compare FIG. 2B) will contain rays with wide distributions of both offset and azimuth, which must somehow be reconciled if the data are to be processed properly.

This reconciliation is not much of a problem in a conventional P-wave survey, wherein the receivers are designed to measure the pressure pulse, and/or the vertical vector component of particle velocity, from an incident P-wave field. In neither 2D nor 3D P-wave surveys does the wide distribution of azimuths in the CRP bin cause serious fundamental problems and a CRP gather containing any number of source-receiver azimuths may be processed via conventional methods, perhaps with minor refinements for wide-azimuth surveys.

By contrast, in a converted-wave survey, the particle motion in the upcoming shear wave is polarized normal to the imaging ray (i.e., the particle motion is nearly horizontal for a nearly vertical ray). Hence the receivers for such a survey are designed to measure these horizontal components of the incident S-wavefield. In this case, the wide distribution of source-receiver azimuths causes an evident problem: the signal on each horizontal component depends on the source-receiver azimuth as well as the physical properties of the medium. Thus, it is one aim of the instant disclosure to teach a method by which vector converted-wave data recorded from different azimuths can be properly combined and used in seismic exploration for subsurface hydrocarbon and mineral resources.

Environment of the Invention

FIG. 3 illustrates the general environment in which the instant invention would typically be used. Seismic data 10 are collected in the field over a subsurface target of potential economic importance and are then taken to a processing center, where a variety of preparatory processes 20 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means. Additionally, if the necessary computer memory is available—as it might be for small data sets—the processed traces could be read into and stored in memory where they might be processed in place in preparation for application of the methods of the instant invention.

The methods disclosed herein would best be implemented in the form of a compiled computer program 30 that has been loaded onto a general purpose programmable computer 50 where it is accessible by a seismic interpreter or processor. A general purpose computer 50 includes, in addition to mainframes and workstations, computers that may provide for parallel or massively parallel computations, wherein the computational load is distributed between two or more processors. As is also illustrated in FIG. 3, some sort of initial compressional and/or shear velocity models 40 must be specified and provided as input to the processing computer program. The exact means by which such models are created, digitized, stored, and later read during program execution is unimportant to the instant invention and those skilled in the art will recognize that this might be done any number of ways.

A program 30 embodying the instant invention might be conveyed into the computer that is to execute it by means of, for example, a floppy disk, a magnetic disk, a magnetic tape, a magneto-optical disk, an optical disk, a CD-ROM, a DVD disk, or loaded over a network. After the instant methods have been applied, the resulting traces would then typically be migrated and displayed, preferably either at a high resolution color computer monitor 60 or in hard-copy form as a printed seismic section or a map 70. The seismic interpreter would then use the displayed images to assist him or her in identifying subsurface features conducive to the generation, migration, accumulation, or presence of hydrocarbons.

Preparatory Processing

Figure 4:
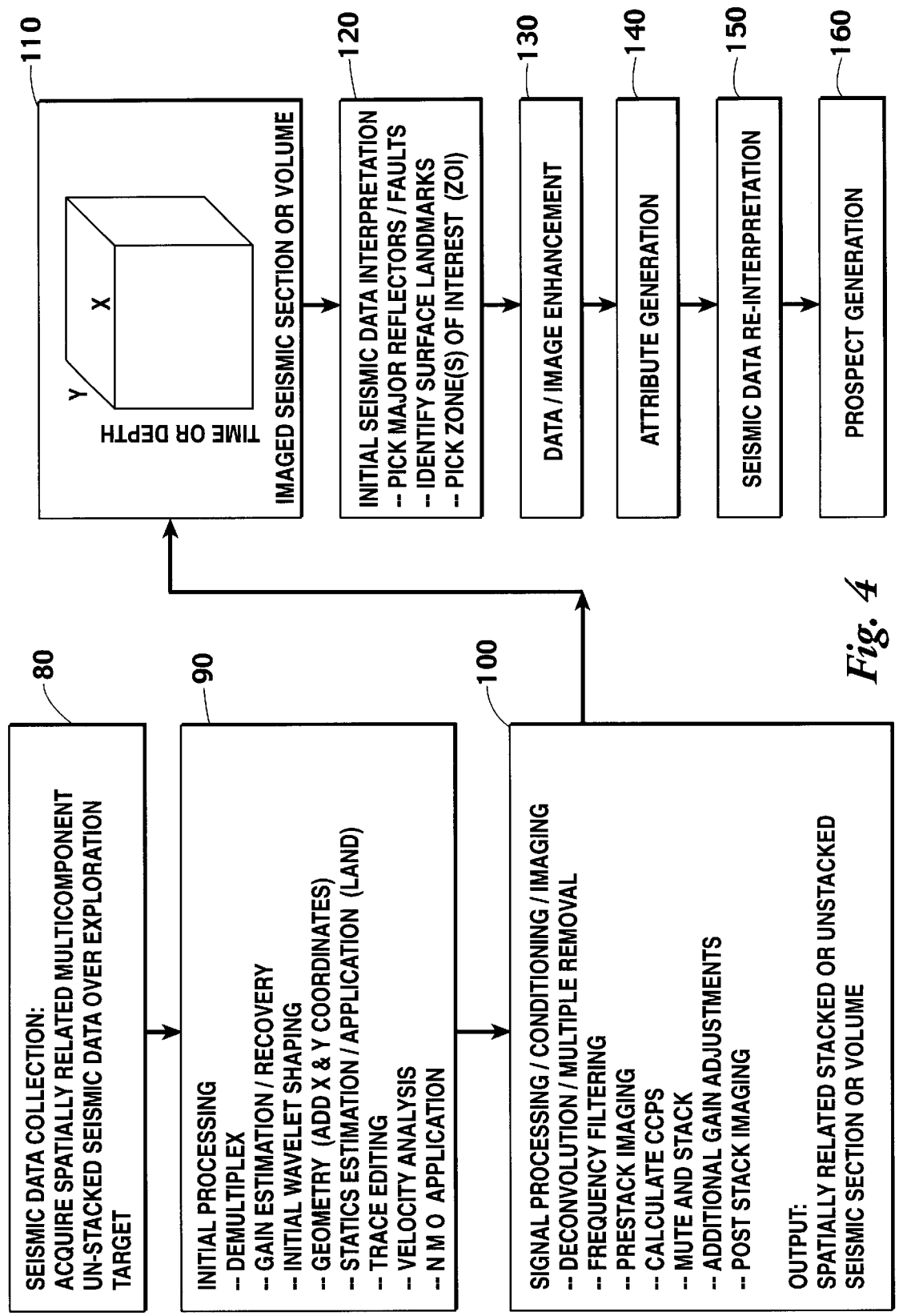
FIG. 4 is a schematic diagram that illustrates how the instant invention might be utilized within a conventional exploration seismic processing stream.

As a first step, and as is generally illustrated in FIG. 4, a 2D or 3D multicomponent seismic survey is conducted over a particular volume of the earth's subsurface (step 80). The data that are collected consist of unstacked (i.e., unsummed) multicomponent seismic traces which contain digital information representative of the volume of the earth lying beneath the survey. Methods by which such data are obtained in a form suitable for use by seismic processors and interpreters are well known to those skilled in the art.

Additionally, those skilled in the art will recognize that the processing steps illustrated in FIG. 4 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

One important objective of a seismic survey is to acquire a collection of spatially related seismic traces over a sub-surface target of some potential economic importance. The instant invention is designed to operate with multicomponent seismic data which might originate, by way of example, from a crooked-line 2D or wide-azimuth 3D multicomponent land, marine, or ocean bottom seismic survey, from a multicomponent VSP, or a multicomponent cross-well survey, among many others. However, the invention disclosed herein is most effective when applied to a group of seismic traces that have an underlying spatial relationship with respect to some subsurface geological feature. For purposes of specificity only, the discussion that follows will be couched in terms of traces collected in a wide-azimuth multicomponent 3D seismic survey.

In the text that follows, the terms "seismic data" and "seismic traces" will be used to indicate vector data or vector traces. That is, each such datum is viewed as a vector (with 2 or 3 components, according to the number of receiver components employed), rather than as a scalar, as would be the case with hydrophone data. It may be that the recorded multicomponent data do not possess "vector fidelity", i.e., that the various components are measured with different sensitivities which might be due to instrumental design (or lack thereof), coupling, or other issues. In a case where the data lack vector fidelity, it should be restored by appropriate processing techniques before application of the instant invention.

As is broadly illustrated in FIG. 4, seismic data typically pass through a number of processing steps before it is ready to be used by interpreters. A common early step is the specification of the geometry of the survey (step 90), at which time each seismic trace is associated with both the position of the physical receiver (or array) on or near the surface of the earth that recorded that particular trace, and the "shot" (or generated seismic signal) that provided the source for the recorded seismic energy. The shot-receiver location information is later used to determine the assigned position of the "stacked" seismic traces and for many other purposes. It would normally be during—or in conjunction with—the velocity analysis/NMO processing steps that one aspect of the instant invention would first be applied.

After the initial pre-stack processing is completed, it is customary to condition the seismic signal on the unstacked seismic traces before creating a stacked (or summed) data volume (step 100). In FIG. 4, the "Signal Processing/ Conditioning/Imaging" step suggest a typical processing sequence, although those skilled in the art will recognize that many alternative processes could be used in place of the ones listed in the figure. In any case, the ultimate goal is the production of a stacked or migrated P or converted-wave seismic volume or, of course, a stacked or migrated P or converted-wave seismic section in the case of 2D data. If the converted-wave data are not C-waves, but correspond to some other conversion mode, then the instant methods will still yield acceptable results, so long as the final leg of the media is the only shear leg, and the CCP gathers are appropriately constructed.

As is suggested in FIG. 4, each digital sample within the stacked seismic volume is uniquely identified by an (X,Y, TIME) triplet: the X and Y coordinates representing some position on or near the surface of the earth, and the time coordinate measuring an arrival time of seismic energy (step 100), with longer reflection arrival times corresponding to deeper reflectors. For purposes of specificity, it will be assumed that the X direction corresponds to the receiver "in-line" direction, and the Y measurement corresponds to the receiver "cross-line" direction, as the terms "in-line" and "cross-line" are generally understood to mean in the art, i.e., with +Y directed at 90° clockwise from +X as viewed from above. Although time is the preferred and most common vertical axis unit, those skilled in the art understand that other units are certainly possible might include, for example, depth or frequency. That being said, the discussion that follows will be framed largely in terms of "time" as a vertical axis measure, but that choice was made for purposes of specificity, rather than out of any intention to so limit the methods disclosed herein. Those skilled in the art will recognize that longer reflection arrival times generally correspond to seismic energy returning from more deeply buried rock units and, as a consequence, units of time and depth are generally interchangeable.

Another important use for seismic data is as a source for seismic attributes (step 140). As is well known to those skilled in the art, seismic attributes are values that are calculated from seismic data and that serve to highlight some specific property or feature of the data that might not otherwise be observable. Although FIG. 4 seems to indicate that seismic attribute generation 140 takes place relatively late in the processing sequence, that is not always the case and attributes might potentially be calculated at almost any point in the sequence.

Mathematical Background

Before describing the details of the present invention, some mathematical concepts related to conventional shear surveys will be presented which will help illuminate the disclosure that follows. It is instructive to begin by considering the conventional solutions which are applied to land-based pure-mode shear surveys which have been conducted with horizontally polarized sources. Additionally, some vocabulary will be developed in this section that will be useful in the subsequent description of the invention that follows. Note that similar mathematical tools to those used in this section can be found in Thomsen, Tsvankin, and Mueller, "Layer-stripping of azimuthal anisotropy from reflection shear-wave data," in *Soc. Expl. Geoph. Expanded Abstracts*, 289–292, 1995, the disclosure of which is incorporated herein by reference.

Multi-component seismic data that have been recorded by a two-component geophone or a geophone array in the field can be expressed as a vector quantity as:

$$\vec{S} = M(\vec{x}) \, s_0 w(t) \, \vec{s} \qquad (1)$$

where "$\otimes$" indicates convolution, where $$\vec{s} = \begin{pmatrix} S_1(t) \\ S_1(t) \end{pmatrix}$$

is a two-component column-vector of the recorded shear data and where the variables $S_1(t)$ and $S_2(t)$ represent the recorded signals from two shear receivers which have been deployed at some predetermined angle with respect to each other. The compact convolutional notation of the previous equation may be expanded as follows for any matrix M and vector $\vec{a}$:

$$M \otimes \vec{a} = \begin{pmatrix} M_{11}(t) & M_{12}(t) \\ M_{21}(t) & M_{22}(t) \end{pmatrix} \otimes \begin{pmatrix} a_1(t) \\ a_2(t) \end{pmatrix}$$

$$= \begin{pmatrix} M_{11}(t) \otimes a_1(t) + M_{12}(t) \otimes a_2(t) \\ M_{21}(t) \otimes a_1(t) + M_{22}(t) \otimes a_2(t) \end{pmatrix},$$

Note that the matrix operations of equation (1) must be performed in the order written, whereas scalar operators in general may have the order of operations commuted.

Figure 5:
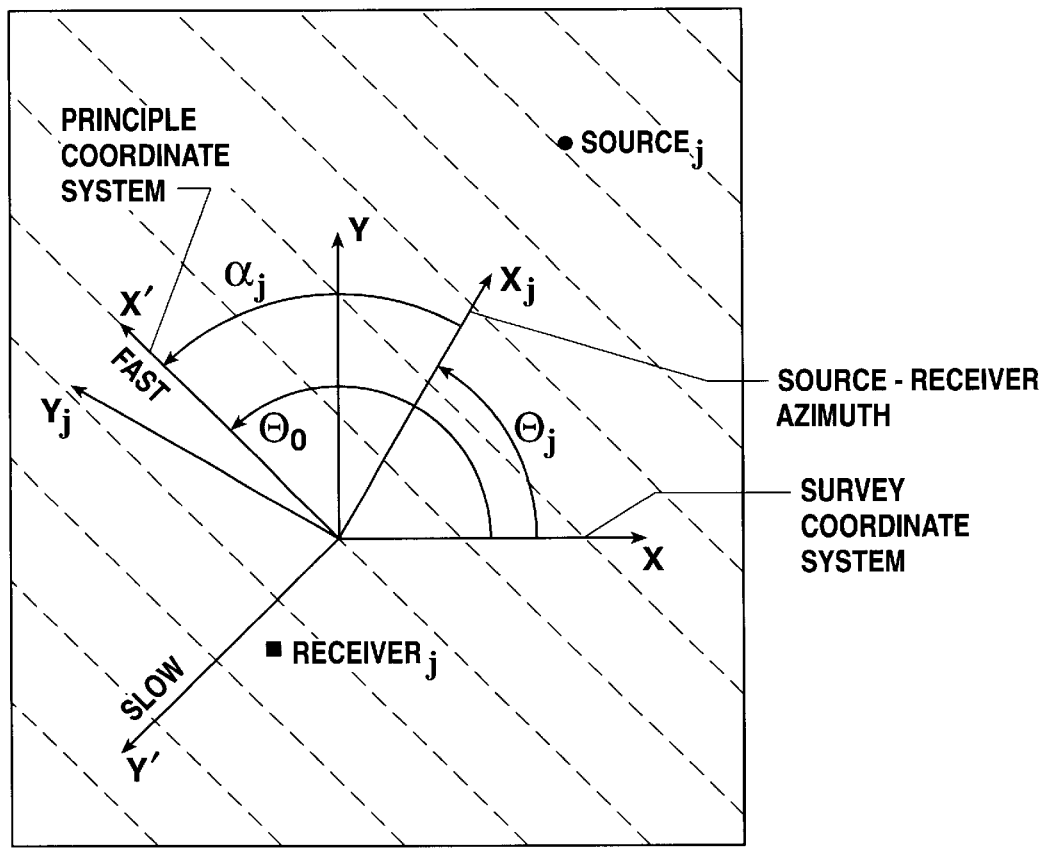
FIG. 5 is a plan view that illustrates the relationship between the survey coordinate system and the principle axes coordinate system.

In the preferred embodiment, the two receiver components are preferably oriented to be orthogonal to each other, and this orientation is preferably the same for all receivers in the survey. If these assumptions are not met, then the recorded data must be transformed (by operations known to those skilled in the art) so that the transformed data meet these requirements as nearly as is possible. The time variable t varies between zero and the duration of the seismic recording, which is typically several seconds. Note that $S_1(t)$ and $S_2(t)$ are time series that might contain thousands of samples, i.e., $S_1(t)$ should be taken to be the entire time series represented by that particular receiver recording. In equation (1), $s_0$ is the scalar amplitude of the source, w(t) is the source signature or wavelet, $\vec{s}$ the two-component column-vector of source orientations, or $$\vec{s} = \begin{pmatrix} \cos\Theta \\ \sin\Theta \end{pmatrix} \tag{2}$$

where the angle $\Theta$ gives the orientation of the source polarization with respect to the survey coordinate system (see, for example, FIG. 5). In equation (1), M is the 2 by 2 matrix that transforms the seismic sources $s_0 w(t) \vec{s}$ into the received signal $\vec{S}$. Assuming that the source is at the same location as the receiver and is aligned with the survey coordinate system, then the values in the M matrix depend only upon this coordinate system and the physical properties of the medium and may be conceptually written as (cf. Thomsen, et al., 1995, cited previously):

$$M = R(-\Theta_0) P R(\Theta_0) \tag{3}$$

where:

$$R(\Theta_0) = \begin{pmatrix} \cos\Theta_0 & \sin\Theta_0 \\ -\sin\Theta_0 & \cos\Theta_0 \end{pmatrix} \tag{4}$$

is the rotation matrix for changing the survey coordinate system into the principal coordinate system via the (unknown) angle $\Theta_0$; and, where P is the unknown diagonal propagator matrix for a single layer, which describes the propagation (time delay, amplitude decay, etc.) of the propagating fast and slow modes (FIG. 5), or $$P = \begin{pmatrix} R^f A^f \otimes \delta(t - t^f) & 0 \\ 0 & R^s A^s \otimes \delta(t - t^s) \end{pmatrix} \tag{5}$$

where $A^f$ and $A^s$ are filters which account for attenuation, dispersion, etc., for the fast and slow modes respectively; $R^f$ and $R^s$ are the corresponding reflection coefficients; and $t^f$ and $t^s$ are the corresponding travel times through a single layer of thickness $z_1$, i.e., $$t_1^f = \frac{z_1}{v_1^f},$$

and, $$t_1^s = \frac{z_1}{v_1^s},$$

and, where $v_1^f$ and $V_1^s$ are the fast and slow shear wave propagation speeds respectively in layer number "1". Note that the rotation matrix $R(\Theta_0)$ may potentially be a time-dependent quantity, with different rotations being applied to different time levels of the seismic trace.

As written, equation (5) applies in the context of a single subsurface reflector. However, it is a simple matter to those skilled in the art to generalize this equation to the case of multiple reflecting horizons, if there is a single azimuth of anisotropy orientation throughout. In more complex cases, the practitioner is referred to Thomsen, et al., 1995, cited previously.

The previous discussion has considered only the case of a single shear source orientation which is excited only along a single axis parallel to the survey coordinate system. In some cases, a second source orientation is excited at each source point, but with an orientation that is different from that of that of the first, preferably orthogonal to it. If there are two source orientations, each having about the same strength and source wavelet (as is normally fairly easy to arrange on land), then two equations like equation (1) may be formed, and both may be written together in a single matrix equation as $$S = M(\vec{x}) s_0 w(t) s, \tag{6}$$

where now S is a 2 by 2 matrix of data, which contains the results of each source orientation in each 2 x 1 column. That is, $$S = \begin{pmatrix} S_{11}(t) & S_{12}(t) \\ S_{21}(t) & S_{22}(t) \end{pmatrix}$$

where $S_{11}(t)$ is the recorded signal corresponding to the first receiver orientation and the first source, where $S_{21}(t)$ is the recorded signal corresponding to the second receiver orientation and the first source, etc. The variable s is now the corresponding matrix of source orientations which may be written explicitly as $$s = \begin{pmatrix} \cos\Theta_1 & \cos\Theta_2 \\ \sin\Theta_1 & \sin\Theta_2 \end{pmatrix}, \tag{7}$$

where $\Theta_1$ and $\Theta_2$ are the angles of the first and second source with respect to the unknown principle axis. By way of simplification, it is common practice to select one source polarization along one axis of the fixed survey coordinate system (e.g., $\Theta_1 = 0°$), and the other source polarization orthogonal to this (e.g., $\Theta_2 = 90°$), so that the matrix s becomes $$s = \begin{pmatrix} 1 & 0 \\ 0 & 1 \end{pmatrix} = I, \tag{8}$$

which means that equation (6) reduces to:

$$S = \underline{\underline{x}} \, s_0 w(t) = R(-\Theta_0) P R(\Theta_0) \underline{\underline{x}} \, s_0 w(t) \qquad (9)$$

Equation (9) is simply a description of the recorded data, in terms of a simple model of shear wave propagation in azimuthally anisotropic media. See, Thomsen et al., 1995, for details. Inspection of the equation shows that, in general, all four elements of the data matrix S contain important reflection data, but that each element contains two arrivals (a fast arrival and a slow arrival) from each subsurface reflector, mixed together with different delays and different trigonometric weights. Since this mixing of fast and slow arrivals poses severe challenges to interpretation, it is necessary to process the data so as to reveal the principal time series.

It has been shown by Alford (see, e.g., Alford, R. M., "Shear data in the presence of azimuthal anisotropy", *Soc. Expl. Geoph. Expanded Absts*, 56, 476–479, 1986) and Thomsen, 1988 cited previously, that: if the sources and receivers are located in the same place (which implies vertical propagation in horizontally layered media), and if the medium has a single orientation of anisotropic symmetry axes throughout, then, a tensor rotation will diagonalize equation (9). That is, multiplying both side of equation (9) from the left by $R(\Theta_0)$ and from the right by $R(-\Theta_0)$, and naming the rotated left side S', it follows that $$S' = R(\Theta_0) S R(-\Theta_0) = s_0 w(t) \underline{\underline{x}} \, R(\Theta_0) M R(-\Theta_0) = R(\Theta_0) R(-\Theta_0) P \underline{\underline{x}} \, s_0 w(t) R(\Theta_0) R(-\Theta_0)$$

Since, $$R(\Theta_0) R(-\Theta_0) = I$$

and since scalar operations commute, the previous equations reduce to:

$$S' = P \underline{\underline{x}} \, s_0 w(t). \qquad (10)$$

If the proper rotation angle ($\Theta_0$) is used in the rotation described above, then the rotated data matrix, S', will be diagonal, since according to equations (10) and (5) the propagation matrix is diagonal. Hence, the rotation operation separates the fast and slow arrivals, which are mixed on all four components of the raw data S, into a fast-only component of the rotated data $S'_{11}(t)$ and a slow-only component of the rotated data $S'_{22}(t)$. So, equation (10) represents a solution to the problem of separating the fast and slow modes.

Of course, in the previous equation the value of $\Theta_0$ is not generally known, representing as it does a property of the rock units in the subsurface. (See FIG. 5.) However, given the recorded seismic data and the geometry of the survey, it is possible to estimate its value.

One popular method of obtaining an estimate of $\Theta_0$ involves choosing the angular value which best diagonalizes the rotated data matrix S'. As the right hand side of equation (10) suggests, the diagonal elements of the properly rotated data matrix S' (i.e., the (1,1) and (2,2) matrix elements) are the so-called "principal time series", representing the separated fast and slow shear modes, respectively. Those skilled in the art will recognize that after the two seismic traces representing the principal time series have been obtained, they may then each be treated as scalar time functions, and conventional processing, designed for such traces, may be thereafter applied. This method has been highly successful when applied to land surveys, where two orthogonal, balanced source polarizations are feasible. However, this method is not applicable to a CCP gather consisting of many traces collected at a variety of source-receiver azimuths and offsets.

Note that the previous discussion has been couched in terms of operations applied to a single two-source-component seismic experiment which has been recorded by a two-component receiver. However, those skilled in the art will recognize that these same operations can be applied to every multicomponent recording in the seismic survey to produce a collection of principal time series that can be processed and combined to form seismic sections and volumes.

Normally, each of these principal time series yields an image of the subsurface which is comparable in quality to conventional P-wave sections (while additionally providing new reflectivity information, specific to shear-wave propagation). The differences between the two time series provides estimates of the azimuthal anisotropy. These differences are commonly (although not necessarily) interpreted in terms of subsurface cracks and fractures, with obvious exploration implications. The differences in the times of the arrivals provide stable, low-resolution estimates of the azimuthal anisotropy, averaged over coarse layers of the subsurface overburden. Finally, the differences in the amplitudes of the arrivals provide stable, high-resolution estimates of the azimuthal anisotropy jumps at the reflecting horizons.

In practice, the zero-offset data required by this theory are replaced by a "stack" of a CMP gather of moveout-corrected, obliquely-incident waves. This works remarkably well in practice (See, e.g., Willis, H. G. Rethford, and E. Bielanski, 1986, "Azimuthal anisotropy: Occurrence and effect on shear wave data quality", *Soc. Expl. Geoph. Expanded Absts*, 56, 479–481, the disclosure of which is incorporated herein by reference). Also, in practice the diagonalization of S is never perfect; nevertheless an angle $\Theta_0$ may be found which causes the diagonal elements of S' to be significantly less than the off-diagonal elements, and where the resulting "slow" principal time series is well correlated with the "fast" principle time series, with a small, time-variable lag.

Also, it has been shown (Thomsen, et al. 1995, cited previously) that if the source is a P-wave converting to a shear wave at the reflector, then the source geometry is that of an in-line horizontally polarized source. Although a modern converted wave survey will normally record three vector components of motion, plus a hydrophone component (if the survey is done under water), making it a so-called "4C survey", the near-surface gradients of velocity will normally mean that incident rays will arrive nearly vertically, so that the polarizations of arriving C-waves are nearly horizontal. Thus, in the discussion which follows, only the two horizontal components of data need be considered.

A CCP gather has up-going shear-wave legs that are more vertical than those of a CMP gather of pure-mode shear waves (with the same source-receiver offsets), hence such rays better approximate the assumption of vertical travel of the theory, above. A 2D CCP gather or stack of such 2-component data may be analyzed for the principal axes of anisotropy via vector (as opposed to tensor) rotation (see, e.g., Thomsen 1988, cited previously).

It is also clear that, if two 2D converted wave surveys cross at right angles, and if both are recorded, with similar acquisition parameters on both in-line and cross-line horizontal geophones, then at the tie point, four CCP stacks may be constructed, and composed into a matrix S which obeys equation (6). Hence, it may be solved for $\Theta_0$ and the two principal time series, via tensor diagonalization, following equation (10). One may term this a "reconstruction" of Alford's approach using converted waves. This is the method of Gaiser, 1997, cited previously.

Multi-component Seismic Vector Processing

According to a first aspect of the instant invention, there is provided a method of vector processing CCP seismic traces, wherein the seismic traces in each CCP gather may have been acquired at a variety of different source-receiver azimuths. Additionally, the instant method results in a statistically "best" data reduction of the traces in the CCP gather. The resulting seismic traces may thereafter be conventionally rotated and processed.

As a starting point, a particular subsurface angle of anisotropy $\Theta_0$ might be provided. That value might come from prior surveys in the area, well logs, oriented cores, etc. It is best that $\Theta_0$ be as accurate as is possible under the circumstances, as the separation of the fast and slow shear wave travel modes depends on this value. In the event that $\Theta_0$ is not known, the embodiment of the instant invention discussed next provides one way of estimating it.

Figure 7A:
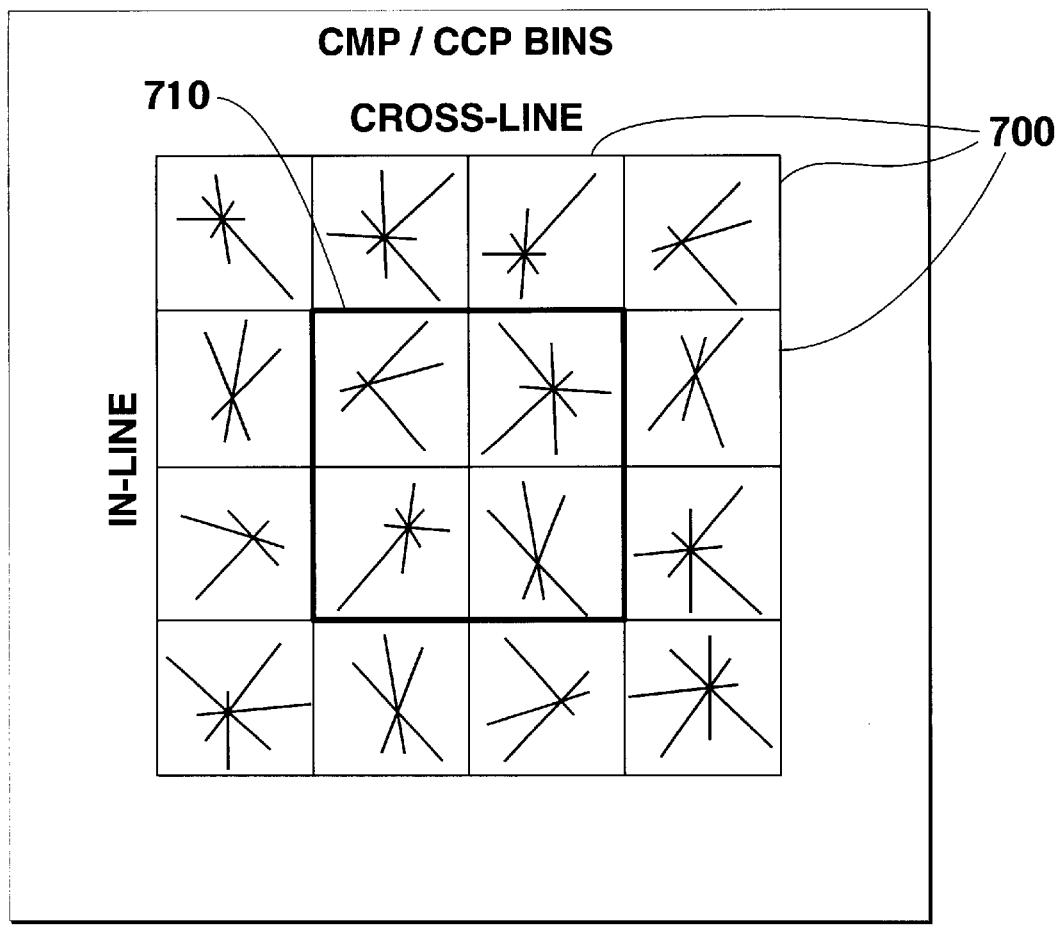
FIG. 7A contains a schematic illustration of how shot-receiver azimuths might be distributed in a collection of 3D CMP/CCP bins.
Figure 7B:
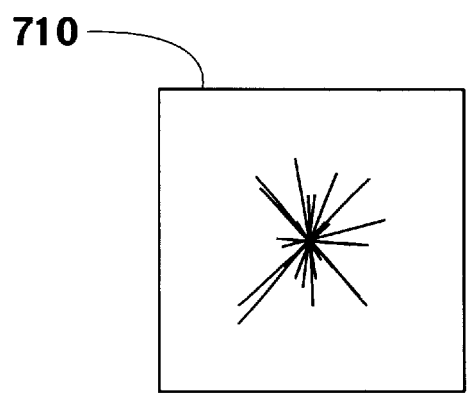
FIG. 7B illustrates how traces from several CMP bins might be combined to form a super bin.

Consider the unstacked traces from a single bin (or a "super bin" containing several adjacent bins) of 3D converted-wave survey. Each bin contains a number of vector traces, say "n", associated with various raypaths in the subsurface, each having its own source and receiver azimuth (FIG. 6). FIG. 7A contains a schematic illustration of how these azimuths might be distributed in practice, where the direction of each line segment represents a source-receiver azimuth within that particular bin 700, with the length of each line segment representing the source-receiver offset. In that figure, note that a super gather might be formed by combining, for example, the traces in the four central bins 710 (FIG. 7B). If there are two components per receiver (as is usually the case), the gather will have 2n single-component traces.

Preferably, the receivers should measure two linearly independent components of particle motion. It is further preferable that these two components be orthogonal with respect to each other, be consistently oriented throughout the survey, and be measured with equivalent sensitivity (both in amplitude and phase) at all necessary frequencies. If these conditions are not met, the traces should be mathematically transformed so that they meet them at least approximately, which transformation may be done via any number of methods well known to those of ordinary skill in the art. That being said, the instant method can be applied—albeit with possibly inferior results—to data that do not strictly meet all of these criteria.

Figure 8A:
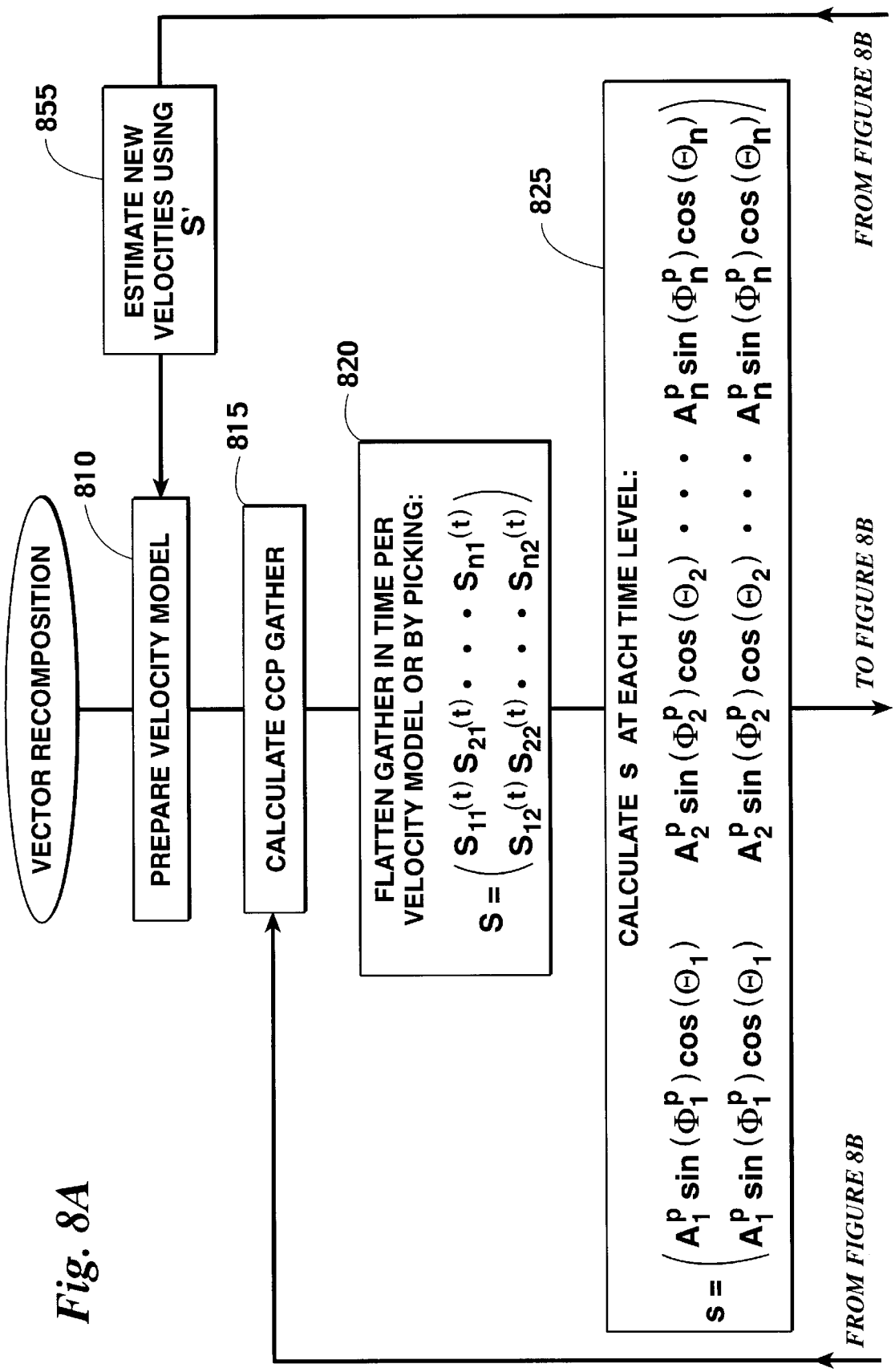
FIGS. 8A and 8B is a flow chart that illustrates the principal steps in one embodiment of the instant invention.
Figure 8B:
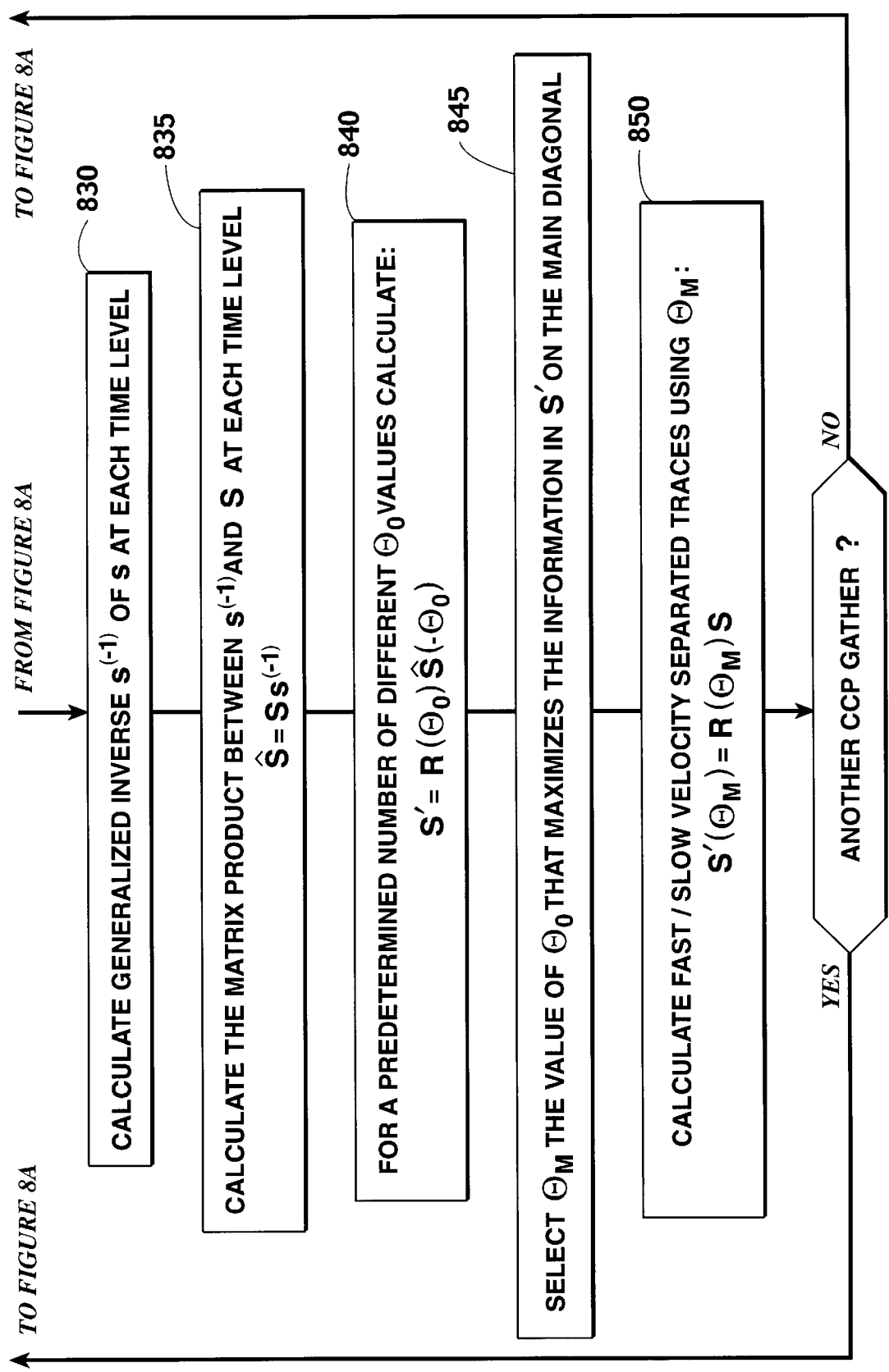

Turning now to FIG. 8, following the preprocessing described earlier, a preferred first step in the practice of the instant invention is to prepare an initial estimate of the velocity ratio $V_p/V_s$ function within the subsurface beneath the survey (step 810). Experience has taught that this model need not be particularly detailed nor unusually accurate: the steps that follow are robust enough to accommodate a fair amount of inaccuracy in the velocity model. In many cases a simple horizontally layered model will suffice (e.g., as is displayed in FIG. 10). However, the practitioner is encouraged to formulate the best initial model that is practicable under the circumstances, as that may reduce the amount of work which is ultimately necessary to obtain a suitably processed section. Of course, one obvious problem facing the practitioner who implements this method is that the velocity function is not generally known with any accuracy until the final step of the method discussed here. Therefore, in the preferred embodiment an iterative process is utilized, wherein velocities are determined after the data have been processed (step 855). Then, given these new velocity estimates, the steps that follow are repeated, and so forth.

Unstacked seismic traces are next organized into either Common Asymptotic Conversion Point (CACP) gathers or, preferably, CCP gathers (step 815). Those skilled in the art will recognize that there may be many ways of mathematically performing this transformation, however the preferred method is described in provisional patent application by Thomsen cited previously. See, also Thomsen, 1998, "Converted wave seismology over anisotropic, inhomogeneous media", Soc. Expl. Geophys. Expanded Abstracts, pp. 2048–2051, the disclosure of which is incorporated herein by reference. That being said, the instant inventor would generally prefer that—which ever method is used—the CCP gathers should be calculated for conversion at the target horizon, rather than in the asymptotic limit. Finally, the CMP to CCP calculation requires the specification of some sort of velocity ratio model, and it is anticipated that velocity ratio model of step 810 will generally be used.

Next, the 2n traces in the current bin are corrected for moveout (step 820) as that term is known in the art (i.e., the samples on each trace are adjusted in time to compensate for the offset-dependant travel-time delay between the shot and receiver). This correction requires at least a rudimentary estimate of the subsurface C-wave velocities and usually takes the form of hyperbolic (or, in some cases, non-hyperbolic) moveout time adjustment. Application of the moveout corrections ideally results in a set of reflectors that are at least approximately flattened in time on each trace in the CCP gather. Alternatively, it is the practice in some cases to flatten the reflectors manually by tracking (e.g., by digitizing or automated picking) them across the gather and then applying time shifts that flatten the reflectors so digitized. In any case, the end goal is the same: to prepare the traces in a CCP gather so that offset-corrected equal travel time samples can be extracted from each trace. Of course, those skilled in the art will recognize that it is not absolutely essential that the seismic traces actually be pre-flattened, but that the computations that are described below are made much simpler if they have been. Thus, in the text that follows a "flattened" gather will be one from which samples corresponding to offset-corrected travel times can be extracted.

The 2n time-flattened traces associated with the CCP gather are next arranged into matrix (or tensor) form. Each of the n rays results in a two-component vector of time-flattened data, which may be composed into a composite 2 by n matrix S, which is now defined as:

$$S = \begin{pmatrix} S_{11}(t) & S_{12}(t) & \ldots & S_{1n}(t) \\ S_{21}(t) & S_{22}(t) & \ldots & S_{2n}(t) \end{pmatrix}, \tag{11}$$

where $S_{ij}(t)$ is the recorded multi-component signal on the ith receiver component (i=1,2) and the jth trace (j=1,n) in the CCP gather. Note that at this stage of processing, each of these traces still contains multiple arrivals-per-reflector, corresponding to a mixture of the fast and slow wave travel modes discussed previously.

The flattened gather S may be represented conceptually using a generalization of an equation introduced previously:

$$S = M(\overline{x}) s_0 w(t) R(-\Theta_j) s \tag{12}$$

where M is given by $$M = R(-\Theta_0) P R(\alpha_j) = R(-\Theta_0) P R(\Theta_0) R(\Theta_j), \quad (13)$$

$\alpha_j$ is the unknown angle between the source-receiver direction and the fast principle direction, and $$\Theta_j = \Theta_0 - \alpha_j \quad (14)$$

(See FIG. 5) is the known angle between the source-receiver direction and the survey x-axis; and s is the effective source-orientation matrix (discussed below). The matrix P of equation (3) is the propagator matrix for one-way travel (see, e.g., Thomsen et. al, 1995, cited previously):

$$P = \begin{pmatrix} C^f A^f \otimes \delta(t - t_f) & 0 \\ 0 & C^s A^s \otimes \delta(t - t^s) \end{pmatrix} \quad (15)$$

where $C^f$ and $C^s$ are the reflection/conversion coefficients, divided by the sine of the incidence angle for the corresponding P-wave; and, $A^f$ and $A^s$ describe amplitude effects due to propagation (geometric spreading, transmission loses, etc.) on the associated upcoming S-leg. The importance of equation (12) is that it demonstrates that—even in the multi-component multi-azimuth case—the recorded seismic signal is ultimately dependent on a diagonal propagation matrix, a fact that will be used below when estimation of subsurface angle of anisotropy $\Theta_0$ is considered. As with equation (5), the previous equation as written applies to the case of a single reflecting/converting horizon. The generalization to many such layers with a single orientation of anisotropy, is a straightforward matter for those skilled in the art.

Assuming that the fundamental source strength so does not vary significantly between shots and that the source wavelet $w_0(t)$ is similarly invariant, an effective source/propagation matrix s may be calculated from the velocity model and a knowledge of the seismic survey geometry:

$$s = \begin{pmatrix} A_1^p \sin\Phi_1^p \cos\Theta_1 & A_2^p \sin\Phi_2^p \cos\Theta_2 & \ldots & A_n^p \sin\Phi_n^p \cos\Theta_n \\ A_1^p \sin\Phi_1^p \sin\Theta_1 & A_2^p \sin\Phi_2^p \sin\Theta_2 & \ldots & A_n^p \sin\Phi_n^p \cos\Theta_n \end{pmatrix} \quad (16)$$

Note that there is a hidden dependence on time (depth) in this equation, and that each entry in the s matrix is in actuality a series of numbers having a length equal to that of the input seismic traces. As is explained in greater detail below, these values are preferably obtained by ray-tracing through the given velocity model, methods of ray tracing that are suitable for use with the instant invention being well known to those skilled in the art. Additionally, note that if the source strength varies substantially or the source wavelet changes between shots, there are methods well known to those skilled in the art to at least approximately correct the recorded seismic data for these problems so that the instant methods can still be applied thereto.

Figure 9:
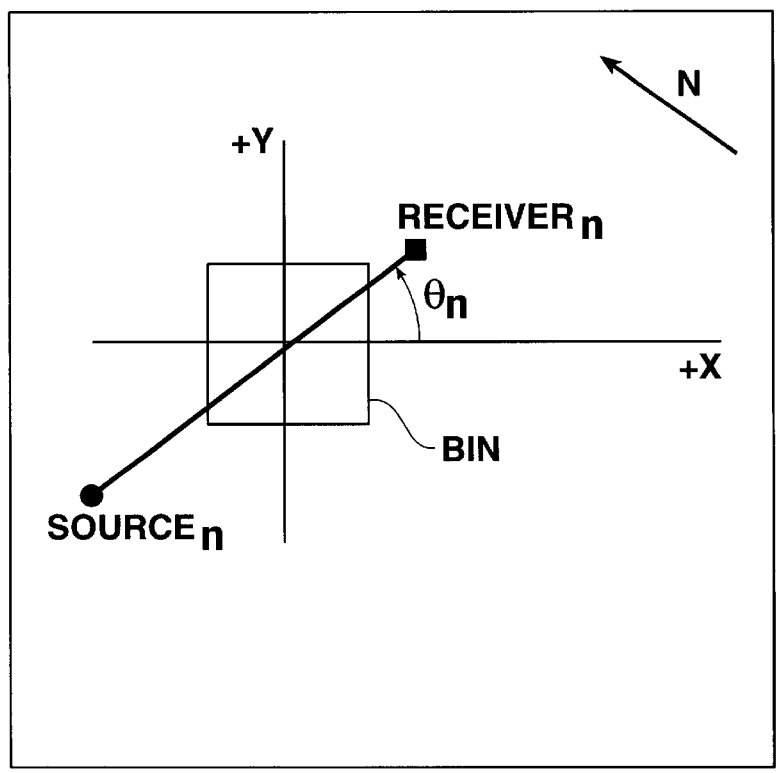
FIG. 9 illustrates how rotation angles are measured with respect to the survey coordinate system.

In the previous equation, the angles $\Theta_i$ are the respective surface-measured angles between the ray-arrival azimuth and the +X direction of the coordinate system of the survey (See FIG. 9). In flat lying geometry, this is the same as the source-receiver azimuth with respect to the survey coordinate system. Note that an implicit assumption has been made in this equation that the horizontal receiver components have been oriented at right angles to each other, although that assumption is not critical. Additionally, recall that each source-receiver pair potentially has a different orientation with respect to the survey coordinate system. So, as many angles $\Theta_i$ will need to be specified as there are vector traces in the CCP gather. The $\Theta_i$ are, however, constant values for each trace at every time.

Figure 10:
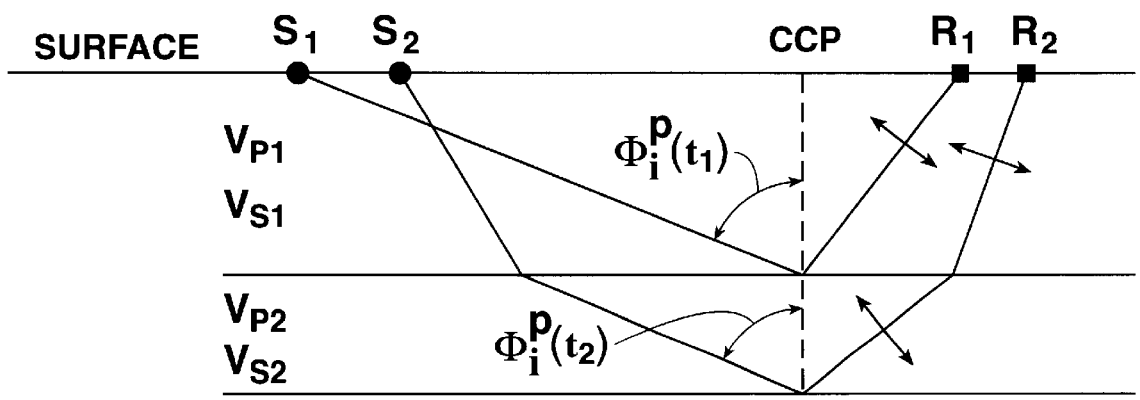
FIG. 10 contains a schematic illustration of how ray tracing might be used to determine the elements in the effective source orientation matrix.

The factors $\sin\Phi_i^p$ and $A_i^p$ in the effective source/propagation matrix are both functions of reflection time and must be estimated by the practitioner. Although these parameters may be roughly estimated geometrically, they are preferably obtained by ray-tracing through the velocity model. As is generally illustrated in FIG. 10, in the preferred embodiment a ray tracing computer program is used to trace the path through the subsurface of each CCP ray in the gather. In the instant figure, a horizontally layered velocity model has been chosen for purposes of illustration, but more complicated models might also be used. Additionally note that the quantities $\sin\Phi_i^p$ and $A_i^p$ are time-dependent values and that $\Phi_i^p$ in FIG. 10 has been indexed by C-wave zero-offset time (i.e., $t_i$) to make more clear that dependency.

The quantity $\sin\Phi_i^p$ gives the projection of the incident P-wave upon the reflecting horizon (for each arrival time), with the angle $\Phi_i^p$ being measured between the ray trajectory and the vertical. The amplitudes $A_i^p$ represent the amplitudes of the various incident P-waves (as decreased from their initial amplitudes by geometric spreading, relative attenuation, source-radiation pattern, etc.), which are also assumed known (e.g., via ray-tracing). These factors will vary, as a function of the depth of the reflector, or equivalently as a function of the moveout-corrected arrival time, and so must be calculated separately for every such time.

Note that in FIG. 10 $\Phi_i^p$ (and $A_i^p$) are actually only determined in the preferred embodiment at arrival times corresponding to the two-way travel time to certain reflectors in the model. One preferred way of filling in the "missing" values between the calculated ones is by interpolation, although other approaches are certainly possible.

In the preferred next step 830 of the instant invention, the "right pseudo-inverse" $s^{(-1)}$ of the source-orientation matrix is calculated. By way of explanation, it is well known that a true inverse $G^{-1}$ of a matrix G—which is only calculable for a square matrix of full rank—is defined as follows:

$$G^{-1} G = G G^{-1} = I \equiv \begin{pmatrix} 1 & 0 \\ 0 & 1 \end{pmatrix}$$

Similarly, the right pseudo-inverse of the 2 by n matrix s is defined as the n by 2 matrix $s^{(-1)}$ such that the difference between $s\,s^{(-1)}$ and I, the 2 by 2 identity matrix, is minimal by some appropriate measure. That is:

$$s\,s^{(-1)} \sim I,$$

where "~" will be taken to mean approximately equal to with respect to some measure. Note that in the case of the effective source strength matrix, the generalized inverse is preferably calculated at each time level. Thus, each horizontal "slice" through the resulting matrix $s^{(-1)}$ will be of dimension n by 2 and "N" generalized inverses will be calculated if there are N samples in the input seismic data gather.

There are many ways of calculating the generalized inverse of a matrix, but the preferred embodiment minimizes at each time level the scalar quantity, $\Delta$, equal to the sum-of-squares of deviations of the elements of $s\, s^{(-1)}$ from $I$, or:

$$\Delta \equiv \sum_{i=1}^{2}\sum_{j=1}^{n}\left(\sum_{k=1}^{n} s_{ik} s_{kj}^{(-1)} - \delta_{ij}\right)^2 \qquad (15)$$

If the 2n unknowns $s_{kj}^{(-)}$, (k=1, 2, ... n; j=1,2) are chosen so as to minimize $\Delta$, conventional least squares methods require that, $$\frac{\partial \Delta}{\partial s_{kj}^{(-1)}} = 0 \quad \ldots \text{ for all } k, j \qquad (16)$$

which leads to:

$$\sum_{q=1}^{2}\sum_{k=1}^{n} s_{pq}^{T} s_{qk} s_{kj}^{(-1)} = s_{pj}^{T}, \text{ for } (p = 1,2, \ldots n; j = 1,2) \qquad (17)$$

with $s^T$ being the transpose of $s$. Equation (17), which contains 2n linear equations in the 2n unknowns $s_{kj}^{(-1)}$, may be solved by standard methods, the resulting values of $s_{kj}^{(-1)}$ depending only on the known values of the source elements $s$.

Those skilled in the art will recognize that the previous method of obtaining the generalized inverse is just one of many ways that could have been used. For example, norms other than least squares (e.g., least absolute value, minimax, etc.) could have been employed in equation (15) as a minimization criterion. Additionally, although the previous equation provides a specific method of solving for $s^{(-1)}$ independently at each time point, that need not always be done and minor variations in this approach could be used to solve for a generalized inverse that is the best single matrix to apply over a given time interval. Further, the solutions at different time levels can be linked together and solved simultaneously (e.g., by instituting some smoothness requirement that limits the amount of change in $s^{(-1)}$ between time steps.)

What is important for purposes of the instant invention, though, is that some sort of approximate matrix inverse is calculated using data from one or more slices of the effective source matrix. A robust calculation of $s^{(-1)}$ requires a good distribution of offsets and azimuths in each gather. Since most 2D surveys, and narrow-azimuth 3D surveys, do not provide a sufficiently diverse distribution of source-receiver azimuths, the preferred application of this invention is to data collected in a wide-azimuth 3D survey. Still, the instant invention can certainly be applied to these other sorts of surveys.

When the right pseudo-inverse $s^{(-1)}$ of $s$ is applied to the effective source matrix, it follows that at each time point the product can be written as:

$$s\, s^{(-1)} = J \qquad (18)$$

where $J$ is the best approximation to an identity matrix $I$ at that time level.

That being said, the preferred use for the generalized inverse matrix is as a data reduction tool, the application of which reduces the current problem to the (previously solved) problem of Alford, 1994, cited previously, and automatically accounts for the various degrees of excitation of the converted wave due to the various source-receiver offsets and azimuths. If the original CCP seismic data matrix $S$ as it appears in equation (12) is now multiplied from the right by $s^{(-1)}$, the result is:

$$\hat{S} = S s^{(-1)}, \qquad (19)$$

where $\hat{S}$ is a 2 by 2 matrix/tensor. In terms of more specific equations, each element in the $\hat{S}$ matrix is calculated as follows:

$$\hat{S}_{ij}(t_m) = \sum_{k=1}^{n} S_{ik}(t_m) s_{kj}^{(-1)}(t_m), \, i = 1,2, \, j = 1,2. \qquad (20)$$

The previous equation has been written to emphasize the fact that the multiplication called for in equation (19) is actually tensor multiplication and is calculated separately at each time level $t_m$, where m might normally be expected to vary over the entire trace, i.e., between 1 and N, the total number of samples in the trace, but other arrangements are certainly possible. The time level $t_m$ can be taken, for purposes of specificity, to be defined as:

$$t_m = (m-1)\Delta t,$$

where $\Delta t$ is the sample rate of the traces in the CCP gather stored in the matrix $S$, so that each trace in the CCP gather spans a total of $(N-1)\Delta t$ seconds of time. Although equation (20) suggests that a separate generalized inverse is to be calculated at each time level—and this is the preferred practice—in some cases only a few (or even one) generalized inverse matrix might be calculated, with each calculated generalized inverse being applied to multiple time levels or interpolated between time levels. Calculating fewer than N generalized inverses and applying each calculated inverse to multiple time levels could result in substantial computational savings in some cases. In the text that follows, a generalized inverse will said to be "associated with" any time level that it is even approximately suited for use with.

Thus, application of the generalized inverse matrix to the original multiple azimuth CCP gather has produced a synthesized four-trace CCP gather, $\hat{S}$, of the 2n traces in the original CCP gather which is a statistically optimum reduction of this multi-azimuth single source component experiment to the equivalent of a two-source component/two-receiver component land seismic shear experiment. The multiple source-receiver azimuths in the original data set have been eliminated and each CCP gather put into a configuration that seismic processors skilled in the art are quite familiar with. The resulting seismic traces, having been corrected for the variable effects of source-receiver azimuth and/or offset, are now available for use in further seismic processing according to methods well known to those skilled in the art. However, the preferred use for the these seismic traces—as input to a routine that determines the unknown subsurface angle of anisotropy—is described below.

Note that application of the generalized inverse matrix has correctly stacked together the multi-azimuthal seismic traces to form composite traces, taking into account their respective orientations. Thus, the instant operation acts as a theoretically correct "stack" of the multi-azimuth traces. Note that $\hat{S}$ is a time-varying linear combination of the original traces, with the particular linear combination chosen based on a theoretical (model) based calculation.

Now, assuming that the model is reasonably accurate and that the angle $\Theta_0$ has been correctly specified, a final rotation of the traces in $\hat{S}$ will produce a velocity-separated compi lation of the original seismic CCP gather. In more particular, consider the following:

$$\hat{S}=Ss^{(-1)}=M(\underline{x})s_0w(t)\:ss^{(-1)}=MJ\:(\underline{x})s_0w(t){\sim}M(\underline{x})s_0w(t) \quad (21)$$

with the final line being approximate in the sense that the matrix J is only approximately an identity matrix.

A final rotation of these traces by the known angle $\Theta_0$:

$$S'=R(\Theta_0)\hat{S}R(\Theta_0){\sim}R(\Theta_0)M(\underline{x})s_0w(t)R(-\Theta_0){\sim}R(-\Theta_0)$$
$$R(\Theta_0)PR(\Theta_0)R(-\Theta_0)(\underline{x})s_0w(t){\sim}P(\underline{x})s_0w(t), \quad (22)$$

produces four seismic traces that at least conceptually replicate the results of a two source-two receiver seismic experiment where the survey coordinate axis coincides with the subsurface principle coordinate axis. The result after rotation is an approximate separation of reflectors corresponding to fast and slow modes on each of the two diagonal elements of S'. Using these traces one can proceed with conventional imaging and anisotropy investigation. In particular, the difference in arrival times of corresponding events gives a stable estimate of average anisotropy, whereas the difference in stacked amplitudes gives a high-resolution estimate of anisotropy differences at the reflector (e.g., see Thomsen, 1988, cited previously).

Of course, it is anticipated by the instant inventor that the above steps might be repeated several times, with a better velocity model produced at each iteration. If necessary, the rotated matrix of seismic traces S'($\Theta$) may be used to provide revised—and presumably improved—velocity estimates (perhaps by using residual moveout) which would then be used to modify the starting velocity model. Repeating the steps 815 to 850 using the new velocity model should produce an improved S'($\Theta$) which could, in turn, be reanalyzed, etc. It should be noted that this second pass analysis should be more precise than the first such analysis (i.e., the one done prior to equation (1)) since there is less mixing of fast and slow modes. It is anticipated that this process will converge fairly quickly in most cases.

Determining the Subsurface Angle of Anisotropy

Of course, it is the rare exploration play in which the angle $\Theta_0$ is known in advance with any degree of accuracy. So, according to a another aspect of the instant invention and as is illustrated in FIG. 8, the instant inventor has provided a method substantially similar to that described previously, but having the further goal of estimating the unknown orientation of the subsurface principal axes with respect to the survey coordinate system. Whereas the previous embodiment assumed that the value of $\Theta_0$ was known, the instant embodiment attempts to determine that value from the traces in a 3D multi-component converted wave seismic survey. In more particular, the instant method uses the combined information from a CCP gather consisting of seismic traces collected at a variety of shot-receiver azimuths to form a composite four-trace matrix that can then be used to estimate the unknown subsurface principal axes orientations. It differs from the methods of Alford 1994 (cited previously) in that it is applied, not to a tensor of shear-wave data, but to a tensor of reduced converted-wave data.

As is illustrated in FIG. 8, the core steps of the instant method are exactly as described previously. As before, a preliminary $V_p$ and $V_s$ velocity model must be specified (step 810) and, preferably, this model will be used to calculate and then flatten a CCP gather (steps 815 and 820). The velocity model will then be used as input to the calculation of the effective source/propagation orientation matrix, from which a generalized inverse will be calculated at each time step (steps 825 and 830). The matrix product between the effective source/propagation matrix s and $\hat{S}$ is then calculated exactly as before, i.e., via equation (19).

Given the matrix $\hat{S}$, an estimate of $\Theta_0$ may be obtained by using any number of conventional approaches. One approach is based on the observation that if the true value of $\Theta_0$ were known, the result of applying the rotation matrix $R(\Theta_0)$ to $\hat{S}$ would be a "nearly" diagonal matrix. This result may be explained via the equations that lead up to equation (22), which demonstrate that, if the rotation angle $\Theta_0$ is chosen properly, the resulting matrix S' will be approximately diagonal, and that the diagonal elements will be the principal time series. Of course, if the chosen value of $\Theta_0$ is not a good approximation to the true value, the resulting matrix after rotation will tend to be less nearly diagonal.

This observation forms the basis for many of the methods that are used in practice to estimate $\Theta_0$. For example, one broad class of methods involves applying a number of different "trial" angular rotations to $\hat{S}$, and then selecting as an estimate of $\Theta_0$ the rotation value $\Theta_M$ that produces the most nearly diagonal rotated matrix S'. To the extent that $\Theta_M$ is a good estimate for $\Theta_0$, the diagonal elements of S' will be good estimates of the principal time series discussed previously. As one specific example of how this approach would preferably be implemented in practice, a variety of provisional angles (say, $\Theta_0=0°, 5°, 10°, 20°$, etc.) are chosen; $\hat{S}$ is rotated by each chosen angle, thereby each producing a corresponding S' (step 840); the energy in the diagonal and off diagonal elements in each rotation is calculated (e.g., by calculating the sum of the squares of each trace); and $\Theta_M$ is chosen to be the rotation angle that produces, say, the greatest on-diagonal to off-diagonal energy ratio. Another preferred method finds $\Theta_M$ by an automatic procedure (e.g., least-squares minimization of some measure of off-diagonal energy or off-diagonal coherency). Still another equally preferable method involves visual comparison of on-diagonal and off-diagonal panels, sections, and/or volumes composed of trial rotations of many CCP gathers. Using this approach, the best $\Theta_0$ is typically the angle that produces off-diagonal sections containing the fewest coherent reflections. Needless to say, many other schemes have been devised to obtain estimates of $\Theta_0$ from these sorts of data. However, a key step in the instant method process is the pre-processing to produce the matrix $\hat{S}$ from the unstacked 2×n CCP gather, $\hat{S}$ being a 2 by 2 matrix that is suitable for analysis by a host of conventional methods.

Those skilled in the art will understand that the method discussed previously would be most useful if applied to an entire section (or volume) of seismic data. In the preferred embodiment, many CCP gathers will be computed together with their corresponding effective source/propagation orientation matrix generalized inverses. The generalized inverses will then be applied to their corresponding CCP gathers to produce a collection of S' will be approximately diagonal, and that the diagonal elements will be the principal time series matrices that contain seismic traces that can be viewed as matrices of sections or volumes. Additionally, once a "best" $\Theta_0$ has been obtained, it may be desirable to perform a velocity analysis on CCP gathers rotated by that angle, i.e., perform a velocity analysis on an S' section. As is generally indicated in FIG. 8, improved velocity estimates (step 855) can then be incorporated into the velocity model and the above process repeated to obtain a better estimate of $\Theta_0$.

An end result of this process is to produce two image volumes, one from each of the two diagonal elements of the matrix S', as well as two quality control volumes (formed from the off-diagonal elements). The two image volumes will resemble each other, and will tend to be cleaner and easier to interpret than images made from the original data, since each seismic arrival in the original data may contain contributions from both fast and slow C modes, whereas the two image volumes of S' each contain only one mode (fast or slow) with no (or little) confusing interference. Generally speaking, the fast and slow images are similar in appearance, however, it is the differences between the two sections—rather than the similarities—that is usually of most interest for purposes of exploration. For example, the slow image will contain reflections appearing at slightly longer times (than the fast image) and may contain seismic events having amplitudes that vary markedly from the corresponding events on the fast image. Both of these differences may be related to azimuthal anisotropy in the subsurface caused by, for example, fractures and/or in situ stress. Since azimuthal anisotropy can an indicator of subsurface structural and stratigraphic features conducive to the generation, migration, accumulation or presence of hydrocarbons, it should be clear that a comparison between well-processed fast and slow sections can be quite useful as an exploration tool.

Finally, a review of the preceding equations should make it clear that, although the subsurface angle of anisotropy $\Theta_0$ has been discussed previously as being a single constant value for all times, in fact that is not required in this approach. Nothing in the previous equations limits the previous steps to using a single angle of rotation and, in fact, the instant inventor has specifically contemplated that $\Theta_0$ might actually take a time-dependent form $\Theta_0(t)$. For example, if the best rotation angle $\Theta_0$ still produces a poor diagonalization of the matrix $\tilde{S}$, then it follows that the assumption of a single orientation of anisotropy at all depths, is in error. In such a case, methods based upon the layer-stripping algorithms of Thomsen, et al., 1995 cited previously may be applied.

Conclusions

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. By way of example, other algorithms may be used to calculate the right pseudo-inverse matrix. Moreover, equivalent computations may be substituted for those illustrated and described. Also certain features of the invention may be used independently of other features of the invention.

In the previous discussion, the language has been expressed in terms of operations performed on conventional multi-component seismic data. But, it is understood by those skilled in the art that the invention herein described could be applied advantageously in other subject matter areas, and used to help locate other subsurface minerals besides hydrocarbons. By way of additional examples, the same approach described herein could be used to process and/or analyze other sorts of seismic data or model-based digital simulations of same. Additionally, those of ordinary skill in the art of seismic exploration and data processing will recognize that the methods claimed hereinafter can be extended to mathematically transformed versions of these same data traces including, for example: frequency domain Fourier transformed data; transformations by discrete orthonormal transforms; wavelet—transformed data; instantaneous phase traces, instantaneous frequency traces, the analytic and quadrature traces; etc. In short, the process disclosed herein can potentially be applied to any collection of geophysical time series containing converted-wave reflections, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series containing converted wave data.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

BIBLIOGRAPHY

The following papers and other publications are specifically incorporated herein by reference:

Aki, K. and P. G. Richards, 1981, QUANTITATIVE SEISMOLOGY, Freeman Press, N.Y.

Alford, R. M., 1986. "Shear data in the presence of azimuthal anisotropy", Soc. Expl. Geoph. Expanded Absts., 56, 476–479.

Alford, R. M., 1994, "Multisource Multireceiver Method and System for Geophysical Exploration", U.S. Pat. No. 5,343,441.

Garotta, R. and P. Granger, 1988, "Acquisition and processing of 3C×3D data using converted waves", Soc. Expl. Geoph. Expanded Absts., 58, 995–997.

Gaiser, J, 1997. "3D converted shear wave rotation with layer stripping", U.S. Pat. No. 5,610,875.

Thomsen, L., "Reflection seismology over azimuthally anisotropic media", Geophysics, v. 53, no. 3, pp. 304–313, 1988.

Thomsen, L., 1986, "Weak elastic anisotropy", Geophysics, v. 51 no. 10, 1954–1966.

Thomsen, L., I. Tsvankin, and M. C. Mueller, 1995, "Layer stripping of azimuthal anisotropy from reflection shear-wave data", Soc. Expl. Geophy. Expanded. Absts., 65, 289–292.

Willis, H. G. Rethford, and E. Bielanski, 1986 "Azimuthal anisotropy: Occurrence and effect on shear wave data quality", Soc. Expl. Geoph. Expanded Absts., 56, 479–481.

What is claimed is:

1. A method of seismic exploration,
   wherein there is provided a seismic survey consisting of unstacked multi-component seismic traces collected over a predetermined volume of the earth,
   said unstacked multicomponent seismic traces being organizable into at least one multicomponent gather having at least four unstacked multicomponent seismic traces associated therewith, and,
   said seismic survey having a survey coordinate system associated therewith,
   wherein at least a portion of the predetermined volume of the earth is characterized by azimuthal anisotropy having an orientation along principal coordinate axes, and,
   comprising the steps of:
   (a) selecting a particular gather from among said at least one multicomponent gather, said particular gather having at least four seismic traces associated therewith;

(b) selecting a time level spanned by said at least four seismic traces;

(c) obtaining a generalized inverse of an effective source/propagation matrix associated with said selected time level;

(d) multiplying said particular gather by said generalized inverse of said effective source/propagation matrix for at least said selected time level, thereby obtaining at least one product matrix;

(e) performing steps (b) through (d) a predetermined number of times, thereby forming a predetermined number of product matrices; and, (f) determining from said predetermined number of product matrices an estimate of an angle necessary to rotate said seismic survey coordinate system to at least approximately match said principle coordinate axes.

2. A method according to claim 1, wherein each of said at least one multicomponent gathers is a CCP gather and said selected particular gather of step (c) is a particular CCP gather.

3. A method according to claim 1 wherein step (a) includes the step of applying an NMO correction to said at least four seismic traces associated with said particular gather.

4. A method according to claim 1 wherein step (a) includes the step of flattening said at least four seismic traces associated with said particular gather.

5. A method of seismic exploration, wherein is provided a predetermined number of product matrices obtained according to the method of claim 1, comprising the step of:

(a) displaying at least a portion of said predetermined number of product matrices.

6. A method of seismic exploration according to claim 5, wherein step (a) includes the steps of:

(a1) organizing said predetermined number of product matrices into at least one seismic trace, and, (a2) displaying at least a portion of said at least one seismic trace.

7. A method according to claim 2, wherein step (f) includes the steps of:

(f1) organizing said predetermined number of product matrices into a synthesized CCP gather, (f2) selecting a provisional angle of rotation, (f3) rotating said synthesized CCP gather by said provisional angle of rotation, thereby producing a rotated synthesized CCP gather, (f4) performing steps (f2) and (f3) a particular number of times, thereby producing a particular number of rotated synthesized CCP gathers, and, (f5) using at least said particular number of rotated synthesized CCP gathers to estimate an angle necessary to rotate said seismic survey coordinate system to at least approximately align it with said principle coordinate axes.

8. A method of seismic exploration according to claim 7, wherein step (f3) includes the step of storing said rotated synthesized CCP gather.

9. A method of seismic exploration according to claim 7, wherein step (f5) includes the step of displaying at least as portion of said predetermined number of rotated synthesized CCP gathers.

10. A device adapted for use by a digital computer wherein a plurality of computer instructions defining the method of claim 1 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

11. A method according to claim 1, wherein step (c) includes the steps of:

(c1) calculating an effective source/propagation matrix associated with said selected time level, and, (c2) calculating a generalized inverse of said effective source/propagation matrix.

12. A method of seismic exploration, wherein there is provided a seismic survey consisting of unstacked multi-component seismic traces collected over a predetermined volume of the earth, said predetermined volume of the earth containing structural and stratigraphic features, wherein there is provided at least one CCP gather that has been formed from said unstacked multi-component seismic traces, each of said at least one CCP gathers being comprised of at least four unstacked CCP traces, each of said at least four unstacked CCP traces spanning a plurality of time levels, and, each of said at least one CCP gathers being associated with at least one generalized inverse of an effective source/propagation matrix, each of said at least one generalized inverses of an effective source/propagation matrix being associated with at least one particular time level within said plurality of time levels spanned by said at least four unstacked CCP traces, comprising the steps of:

(a) selecting a particular CCP gather from among said at least one CCP gathers;

(b) selecting a particular generalized inverse of an effective source/propagation matrix associated with said particular CCP gather;

(c) multiplying said particular CCP by said particular generalized inverse of said effective source/propagation matrix for at least said one time level, thereby obtaining at least one product matrix;

(d) performing steps (b) and (c) a plurality of times, thereby forming a plurality of product matrices; and, (e) organizing said plurality of product matrices into a synthesized CCP gather for use in the identification of said structural and stratigraphic features within said predetermined volume.

13. A method according to claim 12, further including the step of:

(f) performing steps (a) through (e) a predetermined number of times, thereby creating a predetermined number of synthesized CCP gathers.

14. A method according claim 13, further comprising:

(g) storing said predetermined number of synthesized CCP gathers, thereby creating a predetermined number of stored synthesized CCP gathers.

15. A method of seismic exploration, wherein is provided said stored synthesized CCP gathers prepared by the method of claim 14, comprising the steps of:

(a) accessing said stored synthesized CCP gathers; and, (b) displaying at least a portion of said stored synthesized CCP gathers.

16. A method according to claim 15, wherein the step of displaying at least a portion of said predetermined number of synthesized CCP gathers includes the further step of recording visually perceptible images representative of said predetermined number of synthesized CCP gathers on a generally flat medium.

17. A method according to claim 15, wherein said generally flat medium includes a computer monitor.

18. A device adapted for use by a digital computer wherein a plurality of computer instructions defining the method of claim 12 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

19. A method of seismic exploration for hydrocarbons within a predetermined volume of the earth containing structural and stratigraphic features, said predetermined volume of the earth being characterized by at least one subsurface velocity, wherein there is provided a seismic survey consisting of unstacked multi-component CCP gathers collected over said predetermined volume of the earth, at least one of said multi-component CCP gathers being comprised of at least four unstacked CCP traces, each of said at least four unstacked CCP traces spanning a plurality of time levels, and, each of said four or more unstacked CCP traces having at least a shot-receiver azimuth and a shot offset associated therewith, and wherein there is a provided a velocity model that is at least approximately representative of said at least one subsurface velocity within at least a portion of said predetermined volume of the earth, comprising the steps of:

(a) selecting a particular CCP gather having at least four unstacked CCP traces associated therewith from among said at least one multi-component CCP gathers;

(b) selecting a time level spanned by said at least four unstacked CCP traces;

(c) obtaining a generalized inverse of an effective source/propagation matrix associated with said selected time level;

(d) multiplying said particular CCP gather by said generalized inverse of said effective source orientation matrix for at least said selected time level, thereby obtaining at least one product matrix;

(e) performing steps (b) through (d) a plurality of times, thereby forming a plurality of product matrices; and, (f) organizing said plurality of product matrices into a synthesized CCP gather for use in the identification of said structural and stratigraphic features within said predetermined volume of the earth.

20. A method according to claim 19, wherein step (c) includes the steps of:

(c1) calculating an effective source/propagation matrix associated with said selected time level, and, (c2) calculating a generalized inverse of said effective source/propagation matrix.

21. A method according to claim 20, wherein step (c1) includes the steps of:

(i) determining a CCP shot offset and a CCP shot-receiver azimuth for at least four of said at least four seismic traces associated with said particular CCP gather, and, (ii) using at least said velocity model and any CCP shot offsets and any CCP shot-receiver azimuths so determined to calculate an effective source orientation matrix at said selected time level.

22. A method according to claim 21, including the further steps of:

(g) selecting an angular amount;

(h) rotating at least a portion of said synthesized CCP gather by said angular amount, thereby producing a rotated synthesized CCP gather for use in the identification of said subsurface structural and stratigraphic features within said predetermined volume of the earth.

23. A method according to claim 22, wherein the step of rotating at least a portion of said synthesized CCP gather by a predetermined angular amount includes the step of:

(h1) rotating at least a portion of said synthesized CCP gather via the vector operation $R(\Theta_0)S$, where R is a rotation matrix defined as $$R(\Theta_0) = \begin{pmatrix} \cos\Theta_0 & \sin\Theta_0 \\ -\sin\Theta_0 & \cos\Theta_0 \end{pmatrix},$$

and where $\Theta_0$ is said predetermined angular amount, and S is said at least a portion of said synthesized CCP gather.

24. A method according to claim 22, including the further step of:

(i) repeating steps (g) and (h) at least once, thereby producing a plurality of rotations of said at least a portion of said synthesized CCP gather.

25. A method of seismic exploration according to claim 1, including the further steps of:

(g) selecting at least one unstacked multicomponent seismic trace from said multicomponent seismic survey; and, (h) rotating said selected at least one multicomponent seismic trace using said estimate of an angle, thereby producing rotated seismic data for use in the identification of said structural and stratigraphic features within at least a portion of said predetermined volume of the earth associated with the generation, migration, accumulation, or presence of hydrocarbons.

* * * * *

UNITED STATES PATENT AND TRADEMARK OFFICE
CERTIFICATE OF CORRECTION

PATENT NO.    : 6,292,754 B1
DATED         : September 18, 2001
INVENTOR(S)   : Leon Thomsen It is certified that error appears in the above-identified patent and that said Letters Patent is hereby corrected as shown below:

Column 1,
Lines 47 and 48, "pertaining 3D data acquisition" should read -- pertaining to 3D data acquisition --

Column 3,
Line 13, "related to the "principle coordinate" should read -- related to the "principal coordinate --
Line 15, "the principle coordinate" should read -- the principal coordinate --
Line 31, "However, here are many" should read -- However, there are many --

Column 4,
Line 19, "these receivers are designed" should read -- these receivers is designed --
Line 44, "reference). See also Thomsen," should read -- reference. See also Thomsen, --

Column 5,
Line 5, "as through they were part" should read -- as though they were part --
Line 13, "(y') transverse to the source-receiver" should read -- (y') transverse to the source-receiver --
Line 30, "occur at the time travel time." should read -- occur at the travel time. --

Column 7,
Line 4, "a known (or estimated value) of" should read -- a known (or estimated) value of --
Line 62, "principle axes from a" should read -- principal axes from a --

Column 8,
Line 4, "with the principle axes." should read -- with the principal axes. --
Line 62, "and the principle axes" should read -- and the principal axes --

Column 9,
Line 20, "the position, and the elastic" should read -- the position and the elastic --

Column 11,
Line 39, "pass through a number" should read -- passes through a number --
Line 56, "step suggest a typical" should read -- step suggests a typical --

Column 12,
Line 61, "$S_1(t)$" should read -- $S_2(t)$ --

Column 13,
Line 28, "s the two-component" should read -- $\vec{s}$ is the two-component --

UNITED STATES PATENT AND TRADEMARK OFFICE
CERTIFICATE OF CORRECTION

PATENT NO. : 6,292,754 B1
DATED : September 18, 2001
INVENTOR(S) : Leon Thomsen

It is certified that error appears in the above-identified patent and that said Letters Patent is hereby corrected as shown below:

Column 14,
Line 45, "where $S_{21}$, (t) is the" should read -- where $S_{21}$ (t) is the --

Column 15,
Line 3, "S= ⓧ $s_0w(t)$ =" should read -- S=M ⓧ $s_0w(t)$ = --
Line 24, "both side of equation (9)" should read -- both sides of equation (9) --
Line 28, "=R ($\Theta_0$) R-$\Theta_0$) P ⓧ" should read -- =R ($\Theta_0$) R (-$\Theta_0$) P ⓧ --

Column 14,
Line 35, "S=M(x$^1$)$s_0$w (t) 6," should read -- S=Mⓧ$s_0$w(t)s, --

Column 16,
Line 40, "principle time series, with" should read -- principal time series, with --

Column 18,
Line 12, "See, also Thomsen, 1998," should read -- See also Thomsen, 1998, --
Line 43, "if they have been." should read -- if they have been pre-flattened. --

Column 19,
Line 22, "transmission loses," should read -- transmission losses, --
Line 34, "source strength so does" should read -- source strength $s_0$ does --
Line 41, " $A_n^p \sin\Phi_n^p \cos\Theta_n$ " should read -- $A_n^p \sin\Phi_n^p \sin\Theta_n$ --

Column 20,
Line 55, "s $s^{(-1)}$~I," should read -- s $s^{(-1)} \approx$ I, --
Line 57, "where "~" with be taken" should read -- where "$\approx$" will be taken"

Column 21,
Line 9, "the 2n unknowns $s_{kj}^{(-)}$ ' " should read -- the $2_n$ unknowns $s_{kj}^{(-1)}$, --

Line 20, " $s_{pq}^T s_{qk} s_{kj}^{(-1)} = s_{pj}^T$, for " should read -- $s_{pq}^T s_{qk} s_{kj}^{(-1)} = s_{pj}^T$, for --

Column 22,
Line 31, "inverse matrix might be calculated," should read -- inverse matrices might be calculated, --
Line 37, "inverse will said to be" should read -- inverse will be said to be --
Lines 53 and 54, "use for the these seismic" should read -- use for these seismic --
Line 67, "a velocity-separated compi" should read -- a velocity-separated compi- --

UNITED STATES PATENT AND TRADEMARK OFFICE
CERTIFICATE OF CORRECTION

PATENT NO. : 6,292,754 B1
DATED : September 18, 2001
INVENTOR(S) : Leon Thomsen

It is certified that error appears in the above-identified patent and that said Letters Patent is hereby corrected as shown below:

Column 23,
Line 4, "$s_0w(t) \sim M \otimes s_0w(t)$" should read -- $s_0w(t) \approx M \otimes s_0w(t)$ --
Line 10, "$\sim R\ (\Theta_0)M$" should read -- $\approx R\ (\Theta_0)M$ --
Line 10, "$\sim R\ (-\Theta_0)$" should read -- $\approx R\ (-\Theta_0)$ --
Line 11, "$\sim P \otimes s_0w(t)$," should read -- $\approx P \otimes s_0w(t)$, --
Line 16, "principle coordinate axis." should read -- principal coordinate axis. --
Line 37, "prior to equation (1))" should read -- prior to equation (11)) --

Column 24,
Line 55, "a collection of S' will be" should read -- a collection of S' that will be --
Line 56, "and that the diagonal elements" should read -- and the diagonal elements --
Line 64, "the above process repeated" should read -- the above process can be repeated --

Column 25,
Line 19, "anistropy can an indicator" should be -- anisotropy can be an indicator --
Line 28, "times, in fact that is not" should read -- times, in fact, that is not --

Column 26,
Line 35, "Gaiser, J, 1997." should read -- Gaiser, J., 1997. --

Column 27,
Line 29, "exploration, wherein is provided" should read -- exploration, wherein there is provided --
Lines 61-62, "at least as portion of" should read -- at least a portion of --

Column 28,
Line 62, "exploration, wherein is provided" should read -- exploration, wherein there are provided --

Signed and Sealed this

Twenty-fifth Day of February, 2003

JAMES E. ROGAN
*Director of the United States Patent and Trademark Office*